US012573001B2

(12) United States Patent
Xiao et al.

(10) Patent No.: US 12,573,001 B2
(45) Date of Patent: Mar. 10, 2026

(54) IMAGE PROCESSING METHOD AND ELECTRONIC DEVICE TO OBTAIN A FUSED IMAGE BY PERFORMING FUSION PROCESSING BASED ON MASKS

(71) Applicant: HONOR DEVICE CO., LTD., Shenzhen (CN)

(72) Inventors: Bin Xiao, Shenzhen (CN); Xiaolei Qiao, Shenzhen (CN); Congchao Zhu, Shenzhen (CN); Yu Wang, Shenzhen (CN); Tao Shao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 462 days.

(21) Appl. No.: 18/024,365

(22) PCT Filed: Sep. 6, 2022

(86) PCT No.: PCT/CN2022/117324
§ 371 (c)(1),
(2) Date: Mar. 2, 2023

(87) PCT Pub. No.: WO2023/124201
PCT Pub. Date: Jul. 6, 2023

(65) Prior Publication Data
US 2024/0185389 A1      Jun. 6, 2024

(30) Foreign Application Priority Data

Dec. 29, 2021    (CN) .......................... 202111638949.0
Jan. 28, 2022    (CN) .......................... 202210108237.6

(51) Int. Cl.
*G06T 5/50*        (2006.01)
*G06T 7/33*        (2017.01)
*G06T 7/50*        (2017.01)

(52) U.S. Cl.
CPC ................ *G06T 5/50* (2013.01); *G06T 7/337* (2017.01); *G06T 7/50* (2017.01);
(Continued)

(58) Field of Classification Search
CPC ............. G06T 2207/20221; G06T 5/50; G06T 2207/20212; G06T 1/00; G06T 2207/10048; G06T 2207/10024
See application file for complete search history.

(56) References Cited

U.S. PATENT DOCUMENTS 7,435,962 B2    10/2008  Oon et al.
10,382,674 B2    8/2019  Sharma et al.
(Continued)

FOREIGN PATENT DOCUMENTS

CN          106548467 A        3/2017
CN          110047059 A        7/2019
(Continued)

OTHER PUBLICATIONS

Ng et al., A System for Fusing Color and Near-Infrared Images in Radiance Domain, 2021 IEEE/CVF International Conference on Computer Vision Workshops (ICCVW), Montreal, BC, Canada, 2021, pp. 2021-2030, doi: 10.1109/ICCVW54120.2021.00229.*

*Primary Examiner* — Guillermo M Rivera-Martinez
(74) *Attorney, Agent, or Firm* — WOMBLE BOND DICKINSON (US) LLP

(57) ABSTRACT

This application provides an image processing method and an electronic device. The method includes: detecting a first operation on a first control of a first screen; obtaining a first image and a second image in response to the first operation; performing first image processing on the first image to obtain a third image; performing second image processing on the second image to obtain a fourth image; and performing fusion processing on the third image and the fourth
(Continued)

200

Display a first screen, where the first screen includes a first control — S201

Detect a first operation on the first control — S202

Obtain a first image and a second image in response to the first operation — S203

Perform first image processing on the first image to obtain a third image — S204

Perform second image processing on the second image to obtain a fourth image in a second color space — S205

Perform fusion processing on the third image and the fourth image based on at least two masks to obtain a fused image — S206 image based on at least two masks to obtain a fused image, where the at least two masks include at least two of a first mask, a second mask, or a third mask. Based on the solutions of this application, the problem of partial image detail information being lost in an image obtained by a main-camera module can be avoided, and image quality can be improved.

20 Claims, 15 Drawing Sheets

(52) U.S. Cl.
CPC ............... *G06T 2207/10024* (2013.01); *G06T 2207/10048* (2013.01); *G06T 2207/20221* (2013.01)

(56) References Cited

U.S. PATENT DOCUMENTS

| | | | | |
|---|---|---|---|---|
| 11,189,017 | B1 * | 11/2021 | Baqai ........................ | G06T 5/73 |
| 11,240,443 | B2 | 2/2022 | Zhao et al. | |
| 2011/0080401 | A1 * | 4/2011 | Tan ........................... | G06T 5/50 |
| | | | | 345/419 |
| 2011/0122251 | A1 | 5/2011 | Schmidt | |
| 2013/0250322 | A1 * | 9/2013 | Kawabata ............ | H04N 1/6058 |
| | | | | 358/1.9 |
| 2014/0363087 | A1 * | 12/2014 | Tico .......................... | G06T 5/10 |
| | | | | 382/195 |
| 2016/0093029 | A1 * | 3/2016 | Micovic .................... | G06T 3/14 |
| | | | | 348/229.1 |
| 2017/0359534 | A1 * | 12/2017 | Li ........................... | H04N 5/265 |
| 2018/0069996 | A1 * | 3/2018 | Shukla ................... | H04N 23/71 |
| 2018/0097992 | A1 * | 4/2018 | Douady-Pleven ........ | G06T 5/50 |
| 2018/0352134 | A1 * | 12/2018 | Sun ...................... | H04N 23/741 |
| 2019/0253644 | A1 | 8/2019 | Zhu et al. | |
| 2021/0195087 | A1 | 6/2021 | Peng et al. | |
| 2023/0245289 | A1 * | 8/2023 | Ng .......................... | G06V 10/82 |
| | | | | 345/629 |
| 2023/0252612 | A1 * | 8/2023 | Ng ........................... | G06T 5/80 |

FOREIGN PATENT DOCUMENTS

| | | | |
|---|---|---|---|
| CN | 110248105 | A | 9/2019 |
| CN | 110971841 | A | 4/2020 |
| CN | 111970432 | A | 11/2020 |
| CN | 113160286 | A | 7/2021 |
| CN | 113298192 | A | 8/2021 |
| CN | 113379615 | A | 9/2021 |
| JP | 2011010258 | A | 1/2011 |
| WO | 2014172059 | A2 | 10/2014 |
| WO | 2020113404 | A1 | 6/2020 |
| WO | 2021184029 | A1 | 9/2021 |

* cited by examiner

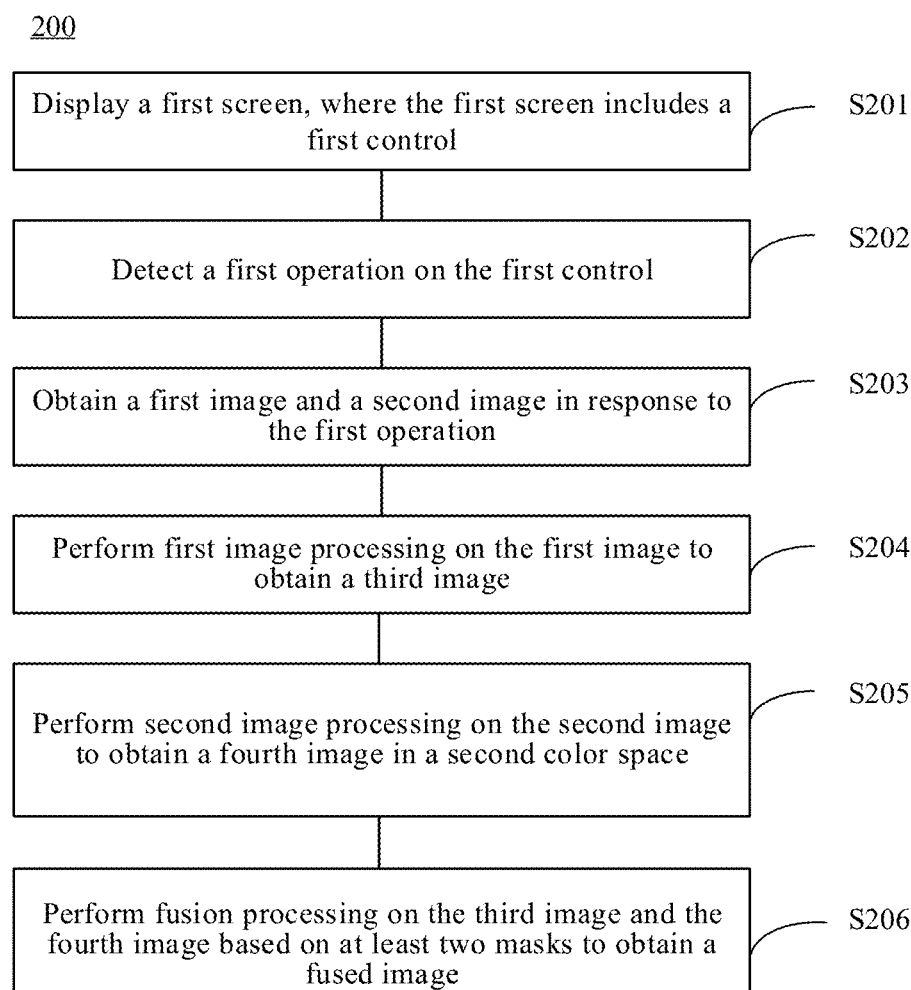

200

| | |
|---|---|
| Display a first screen, where the first screen includes a first control | S201 |
| Detect a first operation on the first control | S202 |
| Obtain a first image and a second image in response to the first operation | S203 |
| Perform first image processing on the first image to obtain a third image | S204 |
| Perform second image processing on the second image to obtain a fourth image in a second color space | S205 |
| Perform fusion processing on the third image and the fourth image based on at least two masks to obtain a fused image | S206 |

Definition mask     Ghosting mask     Semantic segmentation mask     Target mask

600

700

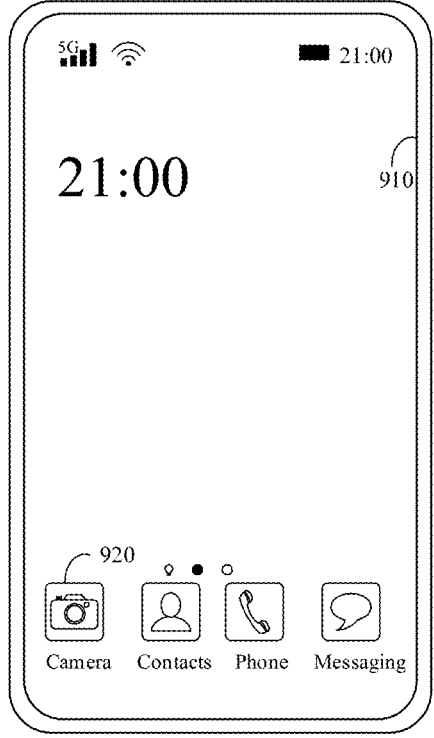
(a)
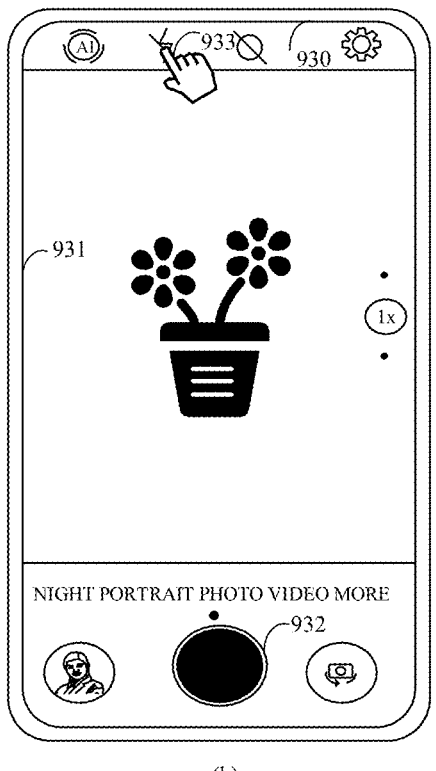
(b)
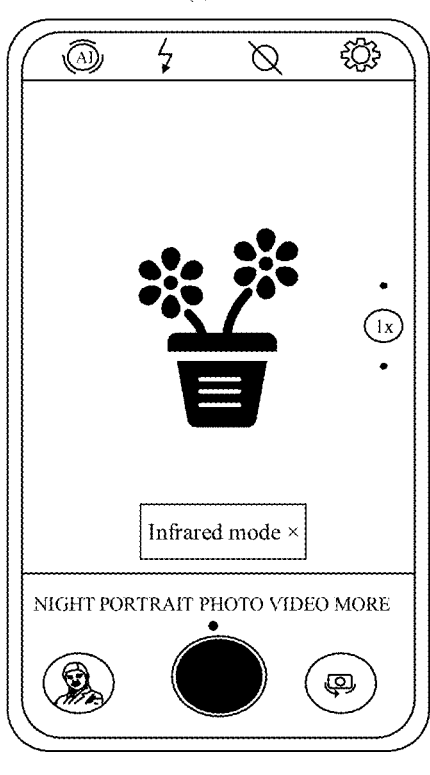
(c)
FIG. 14

IMAGE PROCESSING METHOD AND ELECTRONIC DEVICE TO OBTAIN A FUSED IMAGE BY PERFORMING FUSION PROCESSING BASED ON MASKS

This application is a national stage of International Application No. PCT/CN2022/117324, filed on Sep. 6, 2022, which claims priority to Chinese Patent Application No. 202111638949.0, filed on Dec. 29, 2021, and Chinese Patent Application No. 202210108237.6, filed on Jan. 28, 2022. The disclosures of each of the aforementioned applications are hereby incorporated by reference in their entireties.

TECHNICAL FIELD

This application relates to the field of image processing, and in particular, to an image processing method and an electronic device.

BACKGROUND

With rapid development and wide application of multimedia technologies and network technologies, people use a large amount of image information in daily life and production activities. In some photographing scenes, for example, shooting scenes with a poor light condition such as night scenes or dense fog scenes, an electronic device has relatively small light intake due to the poor light condition of the shooting scene, and therefore part of image detail information is lost in an image obtained by a main-camera module. Image enhancement processing can be usually performed to improve image quality. Image enhancement processing is a method for enhancing wanted information in an image and improving visual effects of the image.

Therefore, how to perform image enhancement on an image obtained by the main-camera module to improve the image quality has become a problem to be urgently resolved.

SUMMARY

This application provides an image processing method and an electronic device, so as to implement image enhancement on an image obtained by a main-camera module to improve image quality.

According to a first aspect, an image processing method is provided, applied to an electronic device. The electronic device includes a first camera module and a second camera module, the first camera module is a near-infrared camera module or an infrared camera module, and the image processing method includes:

displaying a first screen, where the first screen includes a first control;

detecting a first operation on the first control;

obtaining a first image and a second image in response to the first operation, where the first image is an image captured by the first camera module, the second image is an image captured by the second camera module, and the first image and the second image are images in a first color space;

performing first image processing on the first image to obtain a third image, where the third image is an image in a second color space;

performing second image processing on the second image to obtain a fourth image that is in the second color space; and performing fusion processing on the third image and the fourth image based on at least two masks to obtain a fused image, where the at least two masks include at least two of a first mask, a second mask, or a third mask, the first mask is used to mark an image region with a better definition than that of the fourth image in the third image, the second mask is used to mark a ghosting region in the third image, the third mask is used to mark an image region in which a photographed object of a target type is located in the third image, and detail information of the fused image is better than detail information of the second image.

In a possible implementation, the second camera module may be a visible light camera module (for example, an obtained spectral range is 400 nm to 700 nm), or the second camera module may be other camera modules capable of obtaining visible light.

In this embodiment of this application, the electronic device may include the first camera module and the second camera module. The first camera module is a near-infrared camera module or an infrared camera module. The first camera module may capture the first image and the second camera module may capture the second image. Image processing is performed on the first image and the second image to obtain the third image and the fourth image, respectively. Fusion processing is performed on the third image and the fourth image based on at least two masks to obtain a fused image. Because the third image is a near-infrared image or an infrared image, the third image may include information that cannot be obtained from the fourth image. Through fusion processing on the third image and the fourth image, multi-spectrum information fusion on near-infrared light image information and visible light image information can be implemented to make the fused image include more detail information. In addition, fusion processing is performed on the third image and the fourth image based on the at least two masks, and image enhancement can be performed from at least two aspects such as sharpness, ghosting removal, or local details. In this way, image enhancement is implemented for the second image obtained by the second camera module (for example, the main-camera module) to enhance the detail information in the image and improve the image quality.

It should be understood that in this embodiment of this application, not all pixels in the third image have a better definition than those in the fourth image, and therefore an image region with a better definition than that of the fourth image may be obtained from the third image by using the first mask (for example, a definition mask). The image region is then fused with the fourth image, so as to improve a definition of the fused image.

It should be understood that, in this embodiment of this application, some regions of the third image and the fourth image possibly cannot be registered successfully, and the second mask (for example, a ghosting mask) may be used to eliminate a region of the third image that cannot be registered successfully with the fourth image, thereby effectively avoiding ghosting artifacts in the fused image.

It should be understood that in this embodiment of this application, due to different reflectance of near-infrared light for different types of objects, different objects in the third image include different detail information; therefore, an image region in which a photographed object of a target type (for example, green plants or distant mountains) is located may be obtained from the third image based on the third mask (for example, a semantic segmentation mask); and fusion processing is then performed on the image region and the fourth image, to improve local detail information of the fused image.

In a possible implementation, the first color space may be a Raw color space.

In a possible implementation, the second color space may be a YUV color space.

In this embodiment of this application, the third image and the fourth image may be images in the YUV color space, and fusion processing may be performed in the YUV color space. Fusion processing in the YUV color space imposes relatively small requirements on computing power; therefore, fusion processing is performed on the third image and the fourth image based on the at least two masks in the YUV color space, which can improve efficiency of fusion processing.

With reference to the first aspect, in some implementations of the first aspect, the performing fusion processing on the third image and the fourth image based on at least two masks to obtain a fused image includes:

obtaining a target mask based on an intersection of the at least two masks; and performing fusion processing on the third image and the fourth image based on the target mask to obtain the fused image.

In a possible implementation, the target mask may be obtained based on the intersection of the at least two masks; a local image region of the third image may be obtained based on the target mask; and then fusion processing is performed on the local image region of the third image and the fourth image to obtain the fused image.

With reference to the first aspect, in some implementations of the first aspect, the performing first image processing on the first image to obtain a third image includes:

converting the first image to the second color space to obtain a fifth image;

performing global registration processing on the fifth image by using the fourth image as a benchmark to obtain a sixth image; and performing local registration processing on the sixth image by using the fourth image as a benchmark to obtain the third image.

In this embodiment of this application, global registration processing may be performed on the fifth image to obtain the sixth image; and further, local registration processing may be performed on a region of the sixth image, to implement registration between the third image and the fourth image. This can avoid a ghosting region in the fused image due to incomplete registration during fusion processing on the third image and the fourth image.

In a possible implementation, global registration and local registration processing may be performed on the fourth image by using the third image as a benchmark.

With reference to the first aspect, in some implementations of the first aspect, the performing global registration processing on the fifth image by using the fourth image as a benchmark to obtain a sixth image includes:

performing depth estimation on the fourth image to obtain depth information, where the depth information is used to represent a distance between a photographed object in the fourth image and the electronic device;

selecting, based on the depth information, target feature points in the fourth image that meet a preset condition; and performing global registration processing on the fifth image by using the target feature points as a benchmark to obtain the sixth image.

In this embodiment of this application, global registration processing may be performed based on the depth information. The third image (for example, a NIR image) has better effects than the fourth image (for example, an RGB image) not at all pixel positions, for example, for the near scene of the photographed object, the detail information in the third image is less than the detail information in the fourth image. If a relatively large quantity of feature points corresponding to the near scene are extracted from the third image, registration cannot be implemented successfully on the distant scene in the third image and the fourth image, and consequently the fused image is prone to a ghosting problem. Therefore, during global registration on the third image, target feature points of the distant scene may be selected from the fourth image based on the depth information; and global registration processing is performed on the third image by using the target feature points of the fourth image as a benchmark, improving accuracy of global registration.

With reference to the first aspect, in some implementations of the first aspect, the preset condition is that the distance between the photographed object and the electronic device is greater than a first preset threshold.

With reference to the first aspect, in some implementations of the first aspect, the performing local registration processing on the sixth image by using the fourth image as a benchmark to obtain the third image includes:

performing local registration processing on the sixth image by using a lightness channel image corresponding to the fourth image as a benchmark to obtain the third image.

In this embodiment of this application, a lightness of the sixth image (for example, a globally registered NIR image) may be quite different from that of the fourth image (for example, the RGB image); therefore, local registration processing is performed on the sixth image, that is, lightness processing may be performed on the sixth image, to make the third image and the fourth image close in lightness. Due to the third image and the fourth image being close in lightness, a problem of color distortion of the fused image can be effectively reduced during fusion processing on the third image and the fourth image.

With reference to the first aspect, in some implementations of the first aspect, the performing local registration processing on the sixth image by using the fourth image as a benchmark to obtain the third image includes:

obtaining a seventh image based on a union of high-frequency information of the fourth image and high-frequency information of the sixth image;

determining a first image region in the fourth image based on the seventh image;

determining a second image region in the sixth image based on the seventh image; and performing local registration processing on the second image region by using the first image region as a benchmark to obtain the third image.

In this embodiment of this application, the high-frequency information of the sixth image may be different from the high-frequency information of the fourth image, that is, an edge region of a photographed object in the sixth image may be different from an edge region of the photographed object in the fourth image; therefore, local registration processing may be performed on the edge region of the sixth image, thereby effectively reducing ghosting artifacts in an edge region of the fused image.

In a possible implementation, the first color space may be a Raw color space.

In a possible implementation, the second color space may be a YUV color space.

In this embodiment of this application, the third image and the fourth image may be images in the YUV color space, and fusion processing may be performed in the YUV color space. Fusion processing in the YUV color space imposes relatively small requirements on computing power; therefore, fusion processing is performed on the third image and the fourth image based on the at least two masks in the YUV color space, which can improve efficiency of fusion processing.

With reference to the first aspect, in some implementations of the first aspect, the at least two masks are the first mask and the third mask.

With reference to the first aspect, in some implementations of the first aspect, the at least two masks are the first mask, the second mask, and the third mask.

With reference to the first aspect, in some implementations of the first aspect, the electronic device further includes an infrared flash, and the image processing method further includes:

turning on the infrared flash in a dark scene, where the dark scene means that an ambient brightness of a shooting environment in which the electronic device is located is less than a second preset threshold; and
  the obtaining a first image and a second image in response to the first operation includes:
  obtaining the first image and the second image in a case that the infrared flash is turned on.

In this embodiment of this application, the infrared flash in the electronic device may be turned on. The electronic device may include the first camera module and the second module, and when the infrared flash is turned on, reflected light of the photographed object increases, so that the first camera module has more light intake. Due to the increased light intake of the first camera module, the detail information included in the first image captured by the first camera module is also increased. The image processing method in this embodiment of this application is used to perform fusion processing on the images captured by the first camera module and the second camera module, so as to implement image enhancement on the images obtained by the main-camera module and improve the detail information of the images. In addition, the infrared flash is invisible to the user, and the detail information of the images can be improved without user's perception.

With reference to the first aspect, in some implementations of the first aspect, the first screen includes a second control; and the turning on the infrared flash in a dark scene includes:

detecting a second operation on the second control; and
  turning on the infrared flash in response to the second operation.

With reference to the first aspect, in some implementations of the first aspect, the first screen is a photographing screen, and the first control is a control for indicating to take a photograph.

Optionally, the first operation may be a tap operation on the control, for indicating to take a photograph, on the photographing screen.

With reference to the first aspect, in some implementations of the first aspect, the first screen is a video shooting screen, and the first control is a control for indicating to shoot a video.

Optionally, the first operation may be a tap operation on the control, for indicating to shoot a video, on the video shooting screen.

With reference to the first aspect, in some implementations of the first aspect, the first screen is a video call screen, and the first control is a control for indicating to make a video call.

Optionally, the first operation may be a tap operation on the control, for indicating to make a video call, on the video call screen.

It should be understood that the foregoing description uses an example in which the first operation is a tap operation. The first operation may further include a voice indication operation or another operation that indicates the electronic device to take a photo or make a video call. The foregoing describes an example and does not constitute any limitation on this application.

According to a second aspect, an electronic device is provided. The electronic device includes one or more processors, a memory, a first camera module, and a second camera module, where the first camera module is a near-infrared camera module or an infrared camera module, the memory is coupled to the one or more processors, the memory is configured to store computer program code, the computer program code includes a computer instruction, and the one or more processors invoke the computer instruction to cause the electronic device to perform the following:

displaying a first screen, where the first screen includes a first control;
  detecting a first operation on the first control;
  obtaining a first image and a second image in response to the first operation, where the first image is an image captured by the first camera module, and the second image is an image captured by the second camera module;
  performing first image processing on the first image to obtain a third image, where the third image is an image in a first color space;
  performing second image processing on the second image to obtain a fourth image that is in the second color space; and
  performing fusion processing on the third image and the fourth image based on at least two masks to obtain a fused image, where the at least two masks include at least two of a first mask, a second mask, or a third mask, the first mask is used to mark an image region with a better definition than that of the fourth image in the third image, the second mask is used to mark a ghosting region in the third image, the third mask is used to mark an image region in which a photographed object of a target type is located in the third image, and detail information of the fused image is better than detail information of the second image.

With reference to the second aspect, in some implementations of the second aspect, the one or more processors invoke the computer instruction to cause the electronic device to perform the following steps:

obtaining a target mask based on an intersection of the at least two masks; and
  performing fusion processing on the third image and the fourth image based on the target mask to obtain the fused image.

With reference to the second aspect, in some implementations of the second aspect, the one or more processors invoke the computer instruction to cause the electronic device to perform the following steps:

converting the first image to the second color space to obtain a fifth image;
  performing global registration processing on the fifth image by using the fourth image as a benchmark to obtain a sixth image; and
  performing local registration processing on the sixth image by using the fourth image as a benchmark to obtain the third image.

With reference to the second aspect, in some implementations of the second aspect, the one or more processors invoke the computer instruction to cause the electronic device to perform the following steps:

performing depth estimation on the fourth image to obtain depth information, where the depth information is used to represent information of a distance between a photographed object in the fourth image and the electronic device;

selecting, based on the depth information, target feature points in the fourth image that meet a preset condition; and performing global registration processing on the fifth image by using the target feature points as a benchmark to obtain the sixth image.

With reference to the second aspect, in some implementations of the second aspect, the preset condition is that the distance between the photographed object and the electronic device is greater than a first preset threshold.

With reference to the second aspect, in some implementations of the second aspect, the one or more processors invoke the computer instruction to cause the electronic device to perform the following step:

performing local registration processing on the sixth image by using a lightness channel image corresponding to the fourth image as a benchmark to obtain the third image.

With reference to the second aspect, in some implementations of the second aspect, the one or more processors invoke the computer instruction to cause the electronic device to perform the following steps:

obtaining a seventh image based on a union of high-frequency information of the fourth image and high-frequency information of the sixth image;

determining a first image region in the fourth image based on the seventh image;

determining a second image region in the sixth image based on the seventh image; and performing local registration processing on the second image region by using the first image region as a benchmark to obtain the third image.

With reference to the second aspect, in some implementations of the second aspect, the at least two masks are the first mask and the third mask.

With reference to the second aspect, in some implementations of the second aspect, the at least two masks are the first mask, the second mask, and the third mask.

With reference to the second aspect, in some implementations of the second aspect, the electronic device further includes an infrared flash, and the one or more processors invoke the computer instruction to cause the electronic device to perform the following steps:

turning on the infrared flash in a dark scene, where the dark scene means that an ambient brightness of a shooting environment in which the electronic device is located is less than a second preset threshold; and obtaining the first image and the second image in a case that the infrared flash is turned on.

With reference to the second aspect, in some implementations of the second aspect, the first screen includes a second control, and the one or more processors invoke the computer instruction to cause the electronic device to perform the following steps:

detecting a second operation on the second control; and turning on the infrared flash in response to the second operation.

With reference to the second aspect, in some implementations of the second aspect, the first screen is a photographing screen, and the first control is a control for indicating to take a photograph.

With reference to the second aspect, in some implementations of the second aspect, the first screen is a video shooting screen, and the first control is a control for indicating to shoot a video.

With reference to the second aspect, in some implementations of the second aspect, the first screen is a video call screen, and the first control is a control for indicating to make a video call.

According to a third aspect, an electronic device is provided, including a module or unit for executing the image processing method according to the first aspect or any one of the first aspect.

According to a fourth aspect, an electronic device is provided. The electronic device includes one or more processors, a memory, a first camera module, and a second camera module, where the memory is coupled to the one or more processors, the memory is configured to store computer program code, the computer program code includes a computer instruction, and the one or more processors invoke the computer instruction to cause the electronic device to perform the method according to the first aspect or any one of the first aspect.

According to a fifth aspect, a chip system is provided, where the chip system is applied to an electronic device, the chip system includes one or more processors, and the processor invokes a computer instruction to cause the electronic device to perform the method according to the first aspect or any one of the first aspect.

According to a sixth aspect, a computer-readable storage medium is provided. The computer-readable storage medium stores computer program code, and when the computer program code is executed by an electronic device, the electronic device is caused to perform the method according to the first aspect or any one of the first aspect.

According to a seventh aspect, a computer program product is provided. The computer program product includes computer program code, and when the computer program code is executed by an electronic device, the electronic device is caused to perform the method according to the first aspect or any one of the first aspect.

In the embodiments of this application, the electronic device may include the first camera module and the second camera module. The first camera module is a near-infrared camera module or an infrared camera module. The first camera module may capture the first image and the second camera module may capture the second image. Image processing is performed on the first image and the second image to obtain the third image and the fourth image, respectively. Fusion processing is performed on the third image and the fourth image based on at least two masks to obtain a fused image. Because the third image is a near-infrared image or an infrared image, the third image may include information that cannot be obtained from the fourth image. Through fusion processing on the third image and the fourth image, multi-spectrum information fusion on near-infrared light image information and visible light image information can be implemented to make the fused image include more detail information. In addition, in the embodiments of this application, fusion processing is performed on the third image and the fourth image based on the at least two masks, and image enhancement can be performed from at least two aspects such as sharpness, ghosting removal, or local details. In this way, image enhancement is implemented for the second image obtained by the second camera module (for example, the main-camera module) to enhance the detail information in the image and improve the image quality.

BRIEF DESCRIPTION OF DRAWINGS

FIG. 5 is a schematic flowchart of an image processing method according to an embodiment of this application;

FIG. 14 is a schematic diagram of a graphics user interface to which an embodiment of this application is applicable;

DETAILED DESCRIPTION OF EMBODIMENTS

Figure 1:
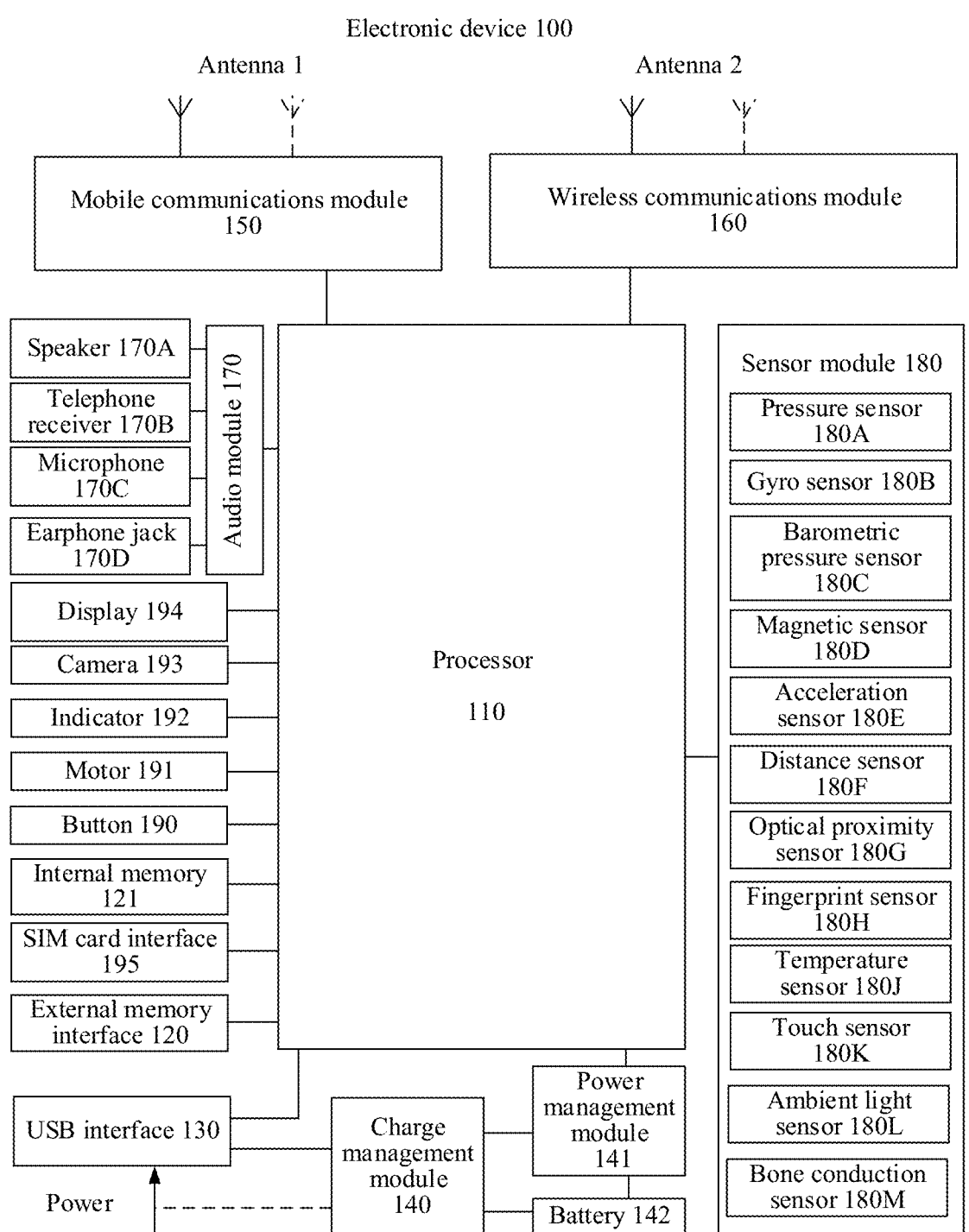
FIG. 1 is a schematic diagram of a hardware system of an electronic device to which this application is applicable.

In embodiments of this application, the following terms "first", "second", "third", and "fourth" are used only for ease of description and cannot be construed as indicating or implying relative importance or implicitly indicating a quantity of technical features.

For ease of understanding of the embodiments of this application, related concepts used in the embodiments of this application are briefly described first.

1. Near Infrared (Near Infrared, NIR)

Near-infrared light refers to electromagnetic waves between visible light and mid-infrared light; and the near-infrared light can be divided into two regions: near-infrared short-wave (780 nm to 1100 nm) and near-infrared long-wave (1100 nm to 2526 nm).

2. Main-Camera Module

The main-camera module is a camera module capable of receiving a spectral range of visible light; for example, a spectral range received by a sensor included in the main-camera module is 400 nm to 700 nm.

3. Near-Infrared Camera Module

The near-infrared camera module is a camera module capable of receiving a spectral range of near-infrared light; for example, a spectral range received by a sensor included in the near-infrared camera module is 700 nm to 1100 nm.

4. High-Frequency Information of an Image

The high-frequency information of the image refers to a region with sharply changing grayscale values in the image; for example, the high-frequency information in the image includes edge information, texture information, and the like of an object.

5. Low-Frequency Information of an Image

The low-frequency information of the image refers to a region with slowly changing grayscale values in the image. For an image, a portion other than high-frequency information is the low-frequency information. For example, the low-frequency information of the image may include content information within edges of the object.

6. Image Registration (Image Registration)

Image registration is a process of matching and superimposing two or more images that are obtained at different times, using different sensors (imaging devices), or under different conditions (weather, illuminance, shooting position, angle, and the like).

7. Lightness Value (Lighting Value, LV)

The lightness value is used for estimating ambient brightness, and its specific calculation formula is as follows:

$$LV = 10 * \log_2\left(\frac{\text{Aperture}^2}{\text{Exposure}} * \frac{100}{Iso} * \frac{Luma}{46}\right);$$

where

Exposure is an exposure time, Aperture is an aperture size, Iso is light sensitivity, and Luma is an average value of Y in an XYZ space of an image.

8. Feature Point

In the fields of image processing and computer vision, feature points (feature points) are also referred to as key points and interest points, and are widely used for resolving a series of problems related to object recognition, image recognition, image matching, visual tracking, three-dimensional reconstruction, and the like (for example, an intersection point of two edges in the image may be referred to as a feature point).

9. Color Correction Matrix (Color Correction Matrix, CCM)

Color correction matrix is used for calibrating accuracy of a color other than white.

10. Three-Dimensional Lookup Table (Three Dimension Look Up Table, 3D LUT)

The three-dimensional lookup table is widely used in image processing; for example, a lookup table may be used for image color correction, image enhancement, image gamma correction, or the like. For example, a LUT may be loaded to an image signal processor, and image processing may be performed on an original image based on the LUT table to implement pixel value mapping of original image frames to change a color style of the image, so as to achieve different image effects.

11. Global Tone Mapping (Global Tone Mapping, GTM)

Global tone mapping is used to resolve a problem of uneven distribution of grayscale values in a high dynamic image.

12. Gamma Processing

Gamma processing is used to adjust brightness, contrast, a dynamic range, and the like of an image by adjusting a gamma curve.

13. Neural Network

The neural network is a network formed by connecting a plurality of single neural units, that is, an output of one neural unit may be an input of another neural unit. An input of each neural unit may be connected to a local receptive field of a previous layer to extract features of the local receptive field, where the local receptive field may be a region formed by several neural units.

14. Back Propagation Algorithm

In a neural network, the error back propagation (back propagation, BP) algorithm may be used to correct parameter values in an initial neural network model during training, so that the neural network model has increasingly small reconstruction error loss. Specifically, error loss is generated when the input signal is passed forward to the output. Parameters in the initial neural network model are updated through back propagation of the error loss information to converge the error loss. The back propagation algorithm is a back propagation movement dominated by error loss, aiming to obtain parameters of an optimal neural network model, such as a weight matrix.

The following describes an image processing method and an electronic device in the embodiments of this application with reference to the accompanying drawings.

FIG. 1 shows a hardware system of an electronic device to which this application is applicable.

The electronic device 100 may be a mobile phone, a smart screen, a tablet computer, a wearable electronic device, an in-vehicle electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. The embodiments of this application impose no limitation on a specific type of the electronic device 100.

The electronic device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that the structure shown in FIG. 1 does not constitute any specific limitation on the electronic device 100. In some other embodiments of this application, the electronic device 100 may include more or fewer components than those shown in FIG. 1, or the electronic device 100 may include a combination of some of the components shown in FIG. 1, or the electronic device 100 may include sub-components of some of the components shown in FIG. 1. The components shown in FIG. 1 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components or an integrated component. The controller may generate an operation control signal according to an instruction operation code and a timing signal, to complete control of instruction fetching and execution.

A memory may be further provided in the processor 110 for storing instructions and data. In some embodiments, the memory in the processor 110 is a cache. The cache may store instructions or data recently used or repeatedly used by the processor 110. If the processor 110 needs to use the instruction or data again, the processor 110 may directly invoke the instruction or data from the memory. This avoids repeated access and reduces a waiting time of the processor 110, thereby improving efficiency of a system.

For example, the processor 110 may be configured to execute an image processing method in the embodiments of this application, for example, displaying a first screen, where the first screen includes a first control; detecting a first operation on the first control; obtaining a first image and a second image in response to the first operation, where the first image is an image captured by the first camera module, the second image is an image captured by the second camera module, and the first image and the second image are images in a first color space; performing first image processing on the first image to obtain a third image, where the third image is an image in a second color space; performing second image processing on the second image to obtain a fourth image that is in the second color space; and performing fusion processing on the third image and the fourth image based on at least two masks to obtain a fused image, where the at least two masks include at least two of a first mask, a second mask, or a third mask, the first mask is used to mark an image region with a better definition than that of the fourth image in the third image, the second mask is used to mark a ghosting region in the third image, the third mask is used to mark an image region in which a photographed object of a target type is located in the third image, and detail information of the fused image is better than detail information of the second image.

A connection relationship between the modules shown in FIG. 1 is merely used as an example for description, and does not constitute any limitation on the connection relationship between the modules of the electronic device 100. Optionally, the modules of the electronic device 100 may alternatively use a combination of a plurality of connection manners in the foregoing embodiments.

A wireless communication function of the electronic device 100 may be implemented by using components such as the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. In addition, different antennas may be multiplexed to improve utilization of the antennas. For example, the antenna 1 may multiplex a diversity antenna used in a wireless local area network. In some other embodiments, the antenna may be used in combination with a tuning switch.

The electronic device 100 may implement a display function by using the GPU, the display 194, the application processor, and the like. The GPU is a microprocessor for image processing, and is connected to the display 194 and the application processor. The GPU is configured to perform mathematical and geometric computing for graphics rendering. The processor 110 may include one or more GPUs that execute program instructions to generate or change display information.

The display 194 may be configured to display images or videos.

The electronic device 100 may implement a shooting function by using the ISP, the camera 193, the video codec, the GPU, the display 194, the application processor, and the like.

The ISP is configured to process data fed back by the camera 193. For example, during photographing, a shutter is opened, light is transferred to a photosensitive element of the camera through a lens, an optical signal is converted to an electrical signal, and the photosensitive element of the camera transfers the electrical signal to the ISP for processing, so that the electrical signal is converted to an image visible to a naked eye. The ISP may optimize noise, brightness, and a color of the image based on algorithms. The ISP may further optimize parameters such as exposure and color temperature of a shooting scene. In some embodiments, the ISP may be disposed in the camera 193.

The camera 193 is configured to capture a static image or a video. An optical image of an object is generated by using a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal to an electrical signal, and then transfers the electrical signal to the ISP. The ISP converts the electrical signal into a digital image signal. The ISP outputs the digital image signals to the DSP for processing. The DSP converts the digital image signal into an image signal in a standard format such as red green blue (red green blue, RGB) or YUV. In some embodiments, the electronic device 100 may include one or N cameras 193, where N is a positive integer greater than 1.

The digital signal processor is configured to process digital signals, including digital image signals and other digital signals. For example, when the electronic device 100 selects a frequency, the digital signal processor is configured to perform Fourier transform and the like on energy of the frequency.

The video codec is configured to compress or decompress a digital video. The electronic device 100 may support one or more types of video codecs, so that the electronic device 100 can play or record videos in a plurality of encoding formats, for example, the moving picture experts group (moving picture experts group, MPEG)1, MPEG2, MPEG3, and MPEG4.

The gyro sensor 180B may be configured to determine a motion posture of the electronic device 100. In some embodiments, an angular velocity of the electronic device 100 around three axes (namely, x, y, and z axes) may be determined by using the gyro sensor 180B. The gyro sensor 180B may be used for image stabilization during shooting. For example, when a shutter is pressed, the gyro sensor 180B detects a shaking angle of the electronic device 100, and calculates, based on the angle, a distance that a lens module needs to be compensated for, so that the lens can move reversely to counteract the shaking of the electronic device 100, so as to implement image stabilization. The gyro sensor 180B may also be used in a navigation scenario, a somatic game scenario, and the like.

The acceleration sensor 180E may detect magnitudes of accelerations of the electronic device 100 in various directions (generally along x, y, and z axes), may detect a magnitude and direction of gravity when the electronic device 100 is static. The acceleration sensor 180E may be further configured to identify a posture of the electronic device 100 as an input parameter of an application such as landscape/portrait mode switching or a pedometer.

The distance sensor 180F is configured to measure a distance. The electronic device 100 may measure a distance by using infrared light or a laser. In some embodiments, for example, in a shooting scene, the electronic device 100 may use the distance sensor 180F to measure a distance for rapid focusing.

The ambient light sensor 180L is configured to sense brightness of ambient light. The electronic device 100 may adaptively adjust brightness of the display 194 based on the sensed brightness of the ambient light. The ambient light sensor 180L may be further configured to automatically adjust white balance during photographing. The ambient light sensor 180L may also cooperate with the optical proximity sensor 180G to detect whether the electronic device 100 is in a pocket to avoid accidental touches.

The fingerprint sensor 180H is configured to collect fingerprints. The electronic device 100 can implement functions such as unlocking, application lock access, shooting, and call answering by using collected fingerprint characteristics.

The touch sensor 180K is also referred to as a touch component. The touch sensor 180K may be disposed on the display 194, and the touch sensor 180K and the display 194 form a touchscreen, also referred to as touch control screen. The touch sensor 180K is configured to detect a touch operation performed on or near the touch sensor 180K. The touch sensor 180K may transfer the detected touch operation to the application processor for determining a touch event type, and may provide a visual output related to the touch operation by using the display 194. In some other embodiments, the touch sensor 180K may alternatively be disposed on a surface of the electronic device 100 at a different location than the display 194.

A hardware system of the electronic device 100 is described in detail above, and a software system of the electronic device 100 is described below.

Figure 2:
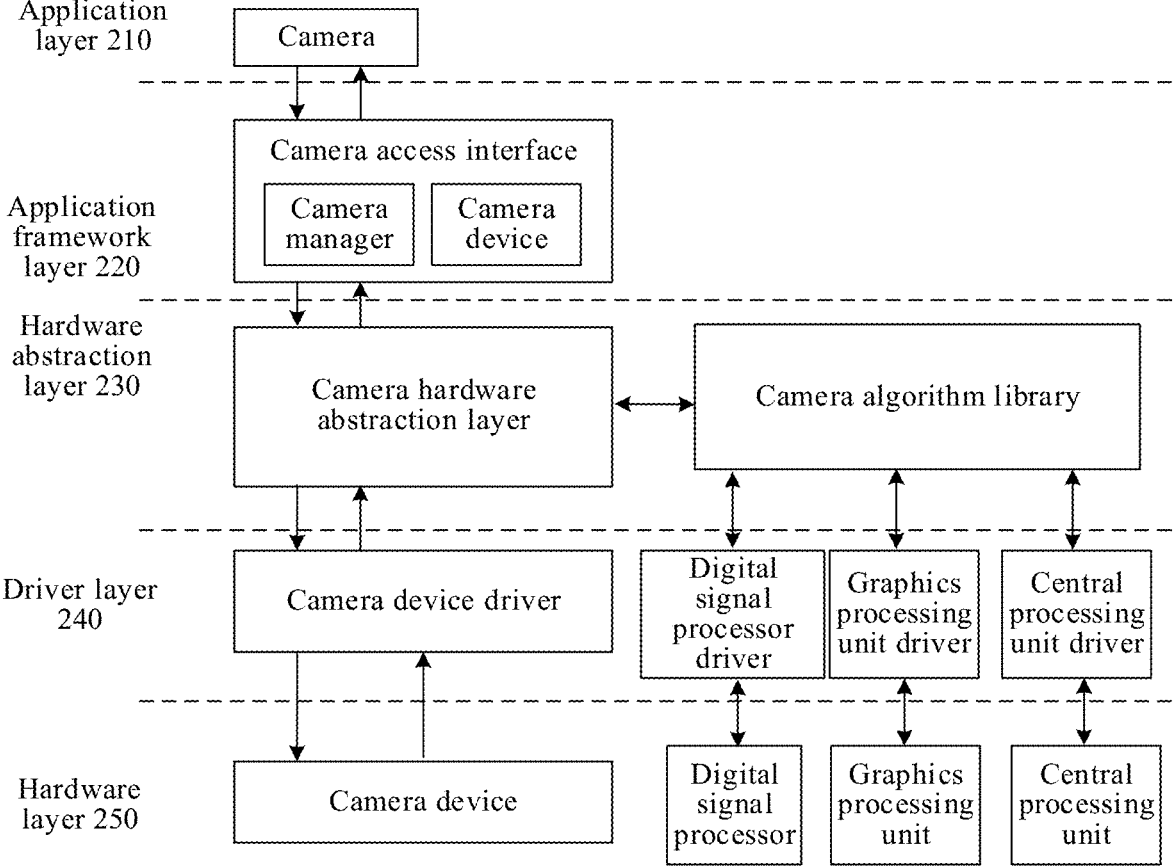
FIG. 2 is a schematic diagram of a software system of an electronic device to which this application is applicable.

FIG. 2 is a schematic diagram of a software system of an apparatus according to an embodiment of this application;

As shown in FIG. 2, a system architecture may include an application layer 210, an application framework layer 220, a hardware abstraction layer 230, a driver layer 240, and a hardware layer 250.

The application layer 210 may include applications such as camera, gallery, calendar, phone, map, navigation, WLAN, Bluetooth, music, video, and messaging.

The application framework layer 220 provides an application programming interface (application programming interface, API) and a programming framework for an application program at the application layer. The application framework layer may include some predefined functions.

For example, the application framework layer 220 may include a camera access interface, and the camera access interface may include a camera manager and a camera device. The camera manager may be used to provide an access interface for managing the camera, and the camera device may be used to provide an interface for accessing the camera.

The hardware abstraction layer 230 is configured to abstract hardware. For example, the hardware abstraction layer may include a camera abstraction layer and other hardware device abstraction layers; and the camera hardware abstraction layer is able to call algorithms in a camera algorithm library.

For example, software algorithms for image processing may be included in the camera algorithm library.

The driver layer 240 is configured to provide drivers for different hardware devices. For example, the driver layer may include a camera device driver, a digital signal processor driver, a graphics processing unit driver, or a central processing unit driver.

The hardware layer 250 may include a camera device and other hardware devices.

For example, the hardware layer 250 includes a camera device, a digital signal processor, a graphics processing unit, or a central processing unit. For example, the camera device may include an image signal processor, and the image signal processor may be used for image processing.

At present, a spectral range obtained by the main-camera module on the terminal device is visible light (400 nm to 700 nm). In some photographing scenes, for example, shooting scenes with a poor light condition such as night scenes or dense fog scenes, an electronic device has relatively small light intake due to the poor light condition of the shooting scene, and therefore part of image detail information is lost in an image obtained by a main-camera module.

In view of this, an embodiment of this application provides an image processing method. The image processing method may be applied to an electronic device. The electronic device may include a first camera module and a second camera module. The first camera module is a near-infrared camera module or an infrared camera module. The first camera module may capture a first image and the second camera module may capture a second image. Image processing is performed on the first image and the second image to obtain a third image and a fourth image, respectively. Fusion processing is performed on the third image and the fourth image based on at least two masks to obtain a fused image. Because the third image is a near-infrared image or an infrared image, the third image may include information that cannot be obtained from the fourth image. Through fusion processing on the third image and the fourth image, multi-spectrum information fusion on near-infrared light image information and visible light image information can be implemented to make the fused image include more detail information. In addition, fusion processing is performed on the third image and the fourth image based on the at least two masks, and image enhancement can be performed from at least two aspects such as sharpness, ghosting removal, or local details. In this way, image enhancement is implemented for the second image obtained by the second camera module (for example, the main-camera module) to enhance the detail information in the image and improve the image quality.

Figure 3:
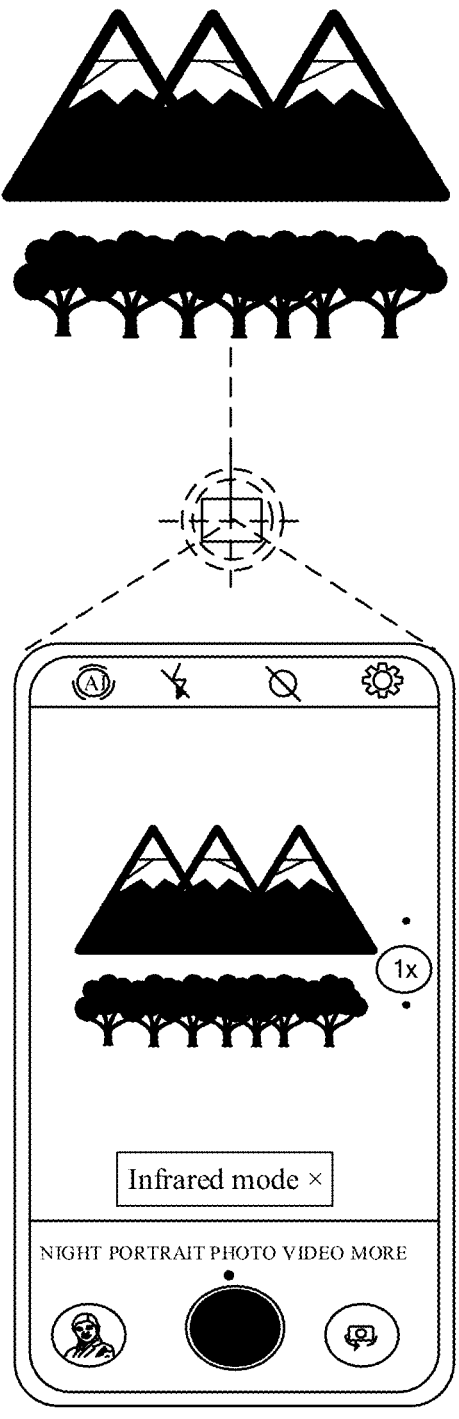
FIG. 3 is a schematic diagram of an application scenario to which an embodiment of this application is applicable.

The following describes application scenarios of the image processing method provided in this embodiment of this application by using examples with reference to FIG. 3.

For example, the image processing method in this embodiment of this application may be applied to the photographing field (for example, single-scene photographing or dual-scene photographing), the video recording field, the video call field, or other image processing fields. A dual-camera module is used in this embodiment of this application, and the dual-camera module includes a first camera module for obtaining near-infrared light (for example, a near-infrared camera module or an infrared camera module) and a second camera module for obtaining visible light. Image processing and fusion processing may be performed on the visible light image and the near-infrared light image based on at least two masks (for example, a definition mask, a ghosting mask, or a speech segmentation mask), to obtain an image with enhanced image quality. Image processing by using the image processing method in this embodiment of this application can enhance detail information in the image and improve the image quality.

In an example, as shown in FIG. 3, this embodiment of this application is applied to landscape photographing (for example, in a cloudy and foggy scene) under the sun. A spectral range that can be obtained by the near-infrared camera module is near-infrared light. As compared with a spectral range of visible light, a spectrum that can be obtained by the near-infrared camera module has longer wavelength, and therefore have a stronger diffraction capability. For example, a spectrum with longer wavelength has stronger penetration, and a captured image has a stronger sense of transparency. Images are captured by the main-camera module and the near-infrared camera module, and fusion processing is performed on the images captured by the two camera modules by using the image processing method provided in this embodiment of this application, to obtain a fused image, as shown in FIG. 3. Detail information of the fused image shown in FIG. 3 is relatively rich, and detail information of a mountain can be clearly presented. The image processing method provided by this embodiment of this application can be used to implement image enhancement for the images obtained by the main-camera module to enhance detail information of the images.

For example, the terminal device shown in FIG. 3 may include a first camera module, a second camera module, and an infrared flash. A spectral range that can be obtained by the first camera module is near-infrared light (700 nm to 1100 nm), and a spectral range that can be obtained by the second camera module includes but is not limited to visible light (400 nm to 700 nm).

In an example, when this embodiment of this application are applied to photographing in a green scene, for a dark light region with a relatively small amount of light intake, because the green scene has a higher reflectance for near-infrared light, the green scene photographed by the main-camera module and the near-infrared scene has more detail information, and detail information of the green scene in the dark light region of the image can be enhanced.

In an example, the image processing method provided in this embodiment of this application may be applied to portrait photographing in a night scene. During portrait photographing in the night scene, the infrared flash in the electronic device may be turned on. For example, a portrait may include a face, eyes, a nose, a mouth, ears, eyebrows, and the like of a photographed object. With the main-camera module and the near-infrared camera module that are included in the electronic device, the photographed object has stronger reflected light when the infrared flash is turned on, so that the near-infrared camera module has more light intake and detail information of a portrait captured by the near-infrared camera module is increased. The image processing method provided by this embodiment of this application can be used to perform fusion processing on images captured by the main-camera module and the near-infrared camera module, so as to implement image enhancement on the images obtained by the main-camera module to improve the detail information of the images. In addition, the infrared flash is invisible to the user, and the detail information of the images can be improved without user's perception.

Optionally, in this embodiment of this application, the electronic device may turn off the near-infrared camera module when detecting food or a portrait.

For example, a food shooting scene may include a plurality of pieces of food, and the near-infrared camera module may capture an image of part of the plurality of pieces of food. For example, the plurality of pieces of food may be peaches, apples, or watermelons, and the near-infrared camera module may capture an image of peaches and apples, but no image of watermelons.

Optionally, the near-infrared camera module may display prompt information to prompt whether to turn on the near-infrared camera module, and the near-infrared camera module can be turned on to capture images only after the user authorizes to turn on the near-infrared camera module.

In an example, the image processing method in this embodiment of this application may be applied to a terminal device with a folding screen. For example, the terminal device with a folding screen may include an outer screen and an inner screen. When an included angle between the outer screen and the inner screen of the terminal device with the folding screen is zero degrees, a preview image may be displayed on the outer screen, as shown in (a) of FIG. 4. When an included angle between the outer screen and the inner screen of the terminal device with the folding screen is an acute angle, a preview image may be displayed on the outer screen, as shown in (b) of FIG. 4. When an included angle between the outer screen and the inner screen of the terminal device with the folding screen is an obtuse angle, a preview image may be displayed on the inner screen, as shown in (c) of FIG. 4. When an included angle between the outer screen and the inner screen of the terminal device with the folding screen is 180 degrees, a preview image may be displayed on the inner screen, as shown in (d) of FIG. 4. The preview image may be obtained by processing an image captured by using the image processing method provided in this embodiment of this application. For example, the terminal device with the folding screen shown in FIG. 4 may include a first camera module, a second camera module, and an infrared flash. A spectral range that can be obtained by the first camera module is visible light (400 nm to 700 nm). The first camera module is a near-infrared camera module or an infrared camera module; and the second camera module may be a visible light camera module or other camera modules that can obtain, but are not limited to, visible light.

It should be understood that the foregoing describes an example application scenario of this embodiment of this application, and does not constitute any limitation to the application scenarios of this application.

The following describes in detail the image processing method provided in the embodiments of this application with reference to FIG. 5 to FIG. 15.

FIG. 5 is a schematic diagram of an image processing method according to an embodiment of this application. The image processing method can be executed by the electronic device shown in FIG. 1. The method 200 includes step S201 to step S206; and the following describes in detail step S201 to step S206.

It should be understood that the image processing method shown in FIG. 5 is applied to an electronic device, and the electronic device includes a first camera module and a second camera module. A spectrum obtained by the first camera module is a near-infrared camera module or an infrared camera module (for example, an obtained spectral range is 700 nm to 1100 nm).

Optionally, the second camera module may be a visible light camera module (for example, an obtained spectral range is 400 nm to 700 nm), or the second camera module may be other camera modules capable of obtaining visible light (for example, an obtained spectral range is 400 nm to 700 nm).

Step S201: Display a first screen, where the first screen includes a first control.

Figure 4:
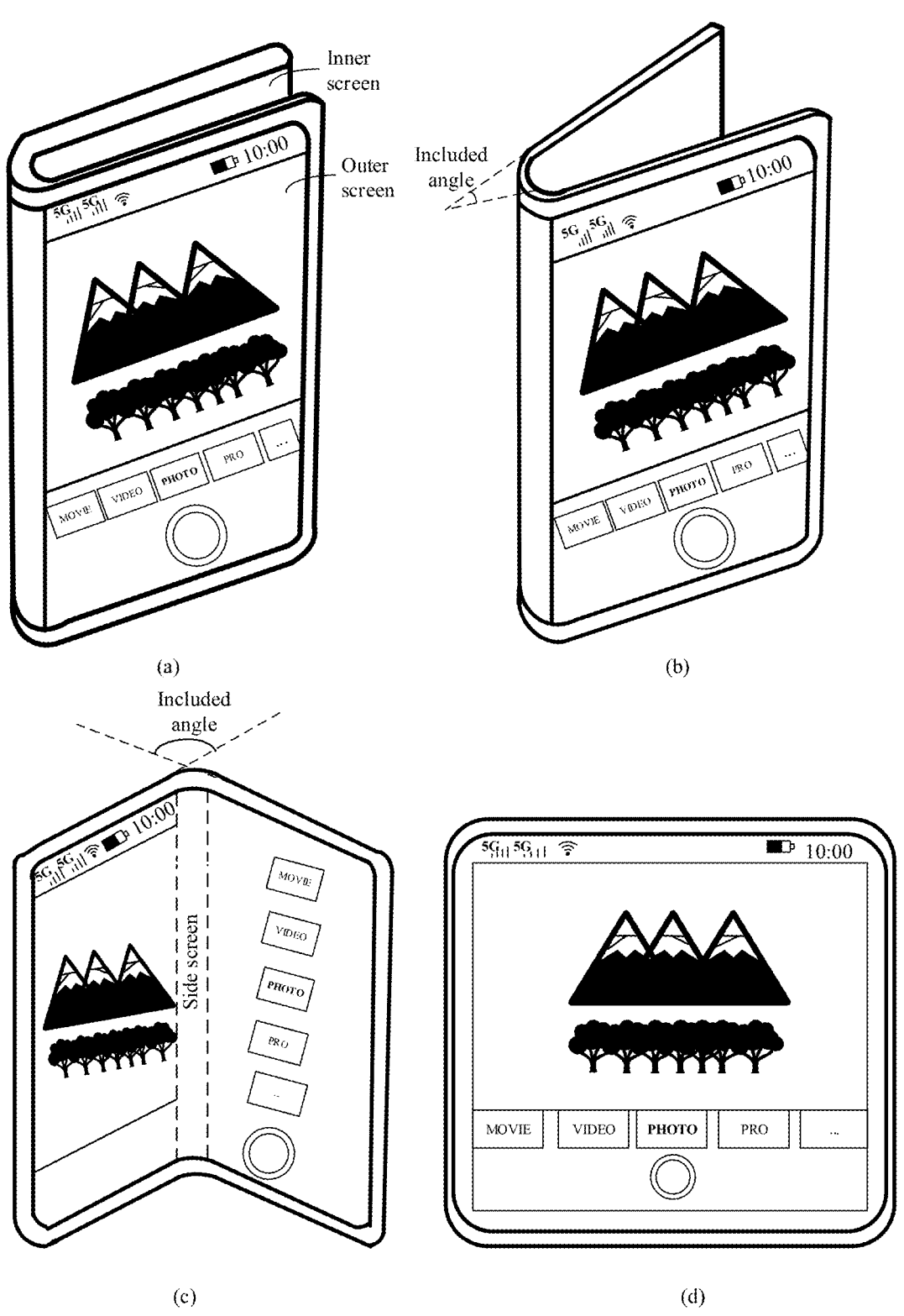
FIG. 4 is a schematic diagram of an application scenario to which an embodiment of this application is applicable.

Optionally, the first screen may be a photographing screen of the electronic device, and the first control may be a control, for indicating to take a photograph, on the photographing screen, as shown in FIG. 3 or FIG. 4.

Optionally, the first screen may be a video shooting screen of the electronic device, and the first control may be a control, for indicating to shoot a video, on the video shooting screen.

Optionally, the first screen may be a video call screen of the electronic device, and the first control may be a control, for indicating to make a video call, on the video call screen.

Step S202: Detect a first operation on the first control.

Optionally, the first operation may be a tap operation on the control, for indicating to take a photograph, on the photographing screen.

Optionally, the first operation may be a tap operation on the control, for indicating to shoot a video, on the video shooting screen.

Optionally, the first operation may be a tap operation on the control, for indicating to make a video call, on the video call screen.

It should be understood that the foregoing description uses an example in which the first operation is a tap operation. The first operation may further include a voice indication operation or another operation that indicates the electronic device to take a photo or make a video call. The foregoing describes an example and does not constitute any limitation on this application.

Step S203: Obtain a first image and a second image in response to the first operation.

The first image is an image captured by the first camera module, the second image is an image captured by the second camera module, and the first image and the second image are images in a first color space.

For example, in response to the first operation, the first camera module may capture the first image, and the second camera module may capture the second image. For example, the first camera module and the second camera module may capture images simultaneously.

Optionally, the first color space may be a Raw color space; and the first image and the second image may be images in the Raw color space.

For example, the first image may be an NIR image in the Raw color space; and the second image may be an RGB image in the Raw color space.

It should be understood that, in this embodiment of this application, the NIR image in the Raw color space may be a NIR Raw and the NIR Raw may be a single-channel image. The NIR Raw image is used to represent intensity information of photons superimposed together. For example, the NIR Raw image may be a single-channel grayscale image.

Step S204: Perform first image processing on the first image to obtain a third image.

The third image is an image in a second color space.

Optionally, the second color space may be a YUV color space or other color spaces.

Optionally, the performing first image processing on the first image to obtain a third image includes:

converting the first image to the second color space to obtain a fifth image; performing global registration processing on the fifth image by using the fourth image as a benchmark to obtain a sixth image; and performing local registration processing on the sixth image by using the fourth image as a benchmark to obtain the third image.

In this embodiment of this application, the first camera module and the second camera module are disposed at different positions in the electronic device, and therefore a specific baseline distance is present between the first camera module and the second camera module. To be specific, there is a specific parallax between an image captured by the first camera module and an image captured by the second camera module. A parallax between the third image and the fourth image can be eliminated through global registration processing and local registration processing. In this way, ghosting in the fusion image can be reduced during fusion processing on the third image and the fourth image.

Optionally, the performing global registration processing on the fifth image by using the fourth image as a benchmark to obtain a sixth image includes:

performing depth estimation on the fourth image to obtain depth information, where the depth information is used to represent a distance between a photographed object in the fourth image and the electronic device; selecting target feature points in the fourth image that meet a preset condition; and performing global registration processing on the fifth image by using the target feature points as a benchmark to obtain the sixth image.

It should be understood that a feature point is a point with sharply changing grayscale values in the image, or a point with a relatively large curvature on an edge of the image. The target feature point may be a feature point satisfying a preset condition in the fourth image.

For example, the preset condition may be that the distance between the photographed object and the electronic device is greater than a first preset threshold. That is, feature points corresponding to a distant scene of the photographed object of the fourth image are selected as the target feature points, and global registration processing is performed on the fifth image based on the target feature points.

It should be understood that global registration processing aims to prevent ghosting regions from occurring in the fused image during fusion processing on the third image and the fourth image. Because image details of a distant-scene region for the photographed object in the third image are better than image details of a distant-scene region for the photographed object in the fourth image, and image details of a near-scene region for the photographed object in the fourth image are better than image details of a near-scene region for the photographed object in the third image, an image region corresponding to the distant-scene region can be selected from the third image and fused with the fourth image. During global registration on the third image, the near-scene region for the photographed object in the third image may not be considered, and registration processing is performed on the distant-scene region for the photographed object in the third image and the distant-scene region (for example, a local image region corresponding to the target feature points) for the photographed object in the fourth image, so as to implement global registration on the third image and the fourth image.

In this embodiment of this application, global registration processing may be performed based on the depth information. The third image (for example, a NIR image) has better effects than the fourth image (for example, an RGB image) not at all pixel positions, for example, for the near scene of the photographed object, the detail information in the third image is less than the detail information in the fourth image. If a relatively large quantity of feature points corresponding to the near scene are extracted from the third image, registration cannot be implemented successfully on the distant scene in the third image and the fourth image, and consequently the fused image is prone to a ghosting problem. Therefore, during global registration on the third image, target feature points of the fourth image may be selected based on the depth information; and registration processing is performed on the third image by using the target feature points of the fourth image as a benchmark.

Optionally, the performing local registration processing on the sixth image by using the fourth image as a benchmark to obtain the third image includes:

performing local registration processing on the sixth image by using a lightness channel image corresponding to the fourth image as a benchmark to obtain the third image.

In this embodiment of this application, a lightness of the sixth image (for example, a globally registered NIR image) may be quite different from that of the fourth image (for example, the RGB image); therefore, local registration processing is performed on the sixth image, that is, lightness processing may be performed on the sixth image, to make the third image and the fourth image close in lightness. Due to the third image and the fourth image being close in lightness, a problem of color distortion of the fused image can be effectively reduced during fusion processing on the third image and the fourth image.

Optionally, the performing local registration processing on the sixth image by using the fourth image as a benchmark to obtain the third image includes:

obtaining a seventh image based on a union of high-frequency information of the fourth image and high-frequency information of the sixth image; determining a first image region in the fourth image based on the seventh image; determining a second image region in the sixth image based on the seventh image; and performing local registration processing on the second image region by using the first image region as a benchmark to obtain the third image.

In this embodiment of this application, the high-frequency information of the sixth image may be different from the high-frequency information of the fourth image, that is, an edge region of a photographed object in the sixth image may be different from an edge region of the photographed object in the fourth image; therefore, local registration processing may be performed on the edge region of the sixth image, thereby effectively reducing ghosting artifacts in an edge region of the fused image.

Step S205: Perform second image processing on the second image to obtain a fourth image that is in the second color space.

Optionally, the second image may be converted to a second color space to obtain the fourth image.

For example, the second color space may be a YUV color space or other color spaces.

Optionally, the second image processing may include ISP image processing; and the ISP processing may include Raw algorithm processing, RGB algorithm processing, or YUV algorithm processing.

For example, Raw algorithm processing may include, but is not limited to:

black level correction (black level correction, BLC), lens shading correction (lens shading correction, LSC), auto white balance (auto white balance, AWB), demosaicing, or the like.

Black level correction is used to correct a black level; lens shading correction is used to eliminate inconsistency of colors and lightness between the periphery of the image and the center of the image due to a lens optical system; and automatic white balance is used to cause the camera to make a white object to present white at any color temperature.

It should be noted that black level correction, lens shading correction, automatic white balance, and demosaicing are used as examples for description above, and Raw algorithm processing is not limited in this application.

For example, RGB algorithm processing may include, but is not limited to:

color correction matrix-based processing, three-dimensional lookup table-based processing, or the like.

A color correction matrix (Color Correction Matrix, CCM) is used to calibrate accuracy of a color other than white. A three-dimensional lookup table (Look Up Table, LUT) are widely used in image processing; for example, the lookup table may be used for image color correction, image enhancement, image gamma correction, or the like. For example, a LUT may be loaded to an image signal processor, and image processing may be performed on an original image based on the LUT table to implement color style mapping from the original image to other images, so as to achieve different image effects.

It should be noted that color correction matrix-based processing and three-dimensional lookup table-based processing are used as examples for description above, and RGB image processing is not limited in this application.

For example, YUV algorithm processing may include, but is not limited to:

global tone mapping processing, gamma processing, or the like.

Global tone mapping (Global tone Mapping, GTM) is used to resolve a problem of uneven distribution of grayscale values in a high dynamic image. Gamma processing is used to adjust brightness, contrast, a dynamic range, and the like of an image by adjusting a gamma curve.

It should be noted that global tone mapping processing and gamma processing are used as examples for description above, and YUV image processing is not limited in this application.

Step S206: Perform fusion processing on the third image and the fourth image based on at least two masks to obtain a fused image.

The at least two masks include at least two of a first mask, a second mask, or a third mask. The first mask is used to mark an image region with a better definition than that of the fourth image in the third image, the second mask is used to mark a ghosting region in the third image, the third mask is used to mark an image region in which a photographed object of a target type is located in the third image, and detail information of the fused image is better than detail information of the second image.

It should be understood that the detail information of the fused image being better than the detail information of the second image may mean the detail information of the fused image being greater than the detail information of the second image, or the detail information of the fused image being better than the detail information of the second image may mean a definition of the fused image being better than a definition of the second image, which may alternatively be other cases and is not limited in this application. For example, the detail information may include edge information, texture information, and the like of the photographed object (for example, hairline edges, face details, clothes folds, edges of each tree of a large number of trees, or branches and leaves of green plants).

It should be understood that in this embodiment of this application, not all pixels in the third image have a better definition than those in the fourth image, and therefore an image region with a better definition than that of the fourth image may be obtained from the third image by using the first mask (for example, a definition mask). The image region is then fused with the fourth image, so as to improve a definition of the fused image.

It should be understood that, in this embodiment of this application, some regions of the third image and the fourth image possibly cannot be registered successfully, and the second mask (for example, a ghosting mask) may be used to eliminate a region of the third image that cannot be registered successfully with the fourth image, thereby effectively avoiding ghosting artifacts in the fused image.

It should be understood that in this embodiment of this application, due to different reflectance of near-infrared light for different types of objects, different objects in the third image include different detail information; therefore, an image region in which a photographed object of a target type (for example, green plants or distant mountains) is located may be obtained from the third image based on the third mask (for example, a semantic segmentation mask); and fusion processing is then performed on the image region and the fourth image, to improve local detail information of the fused image.

Optionally, the at least two masks are the first mask and the third mask. For example, a definition mask and a semantic segmentation mask may be obtained; and fusion processing is performed on the third image and the fourth image based on the definition mask and the semantic segmentation mask, so as to obtain the fused image.

Optionally, the at least two masks are the first mask, the second mask, and the third mask. For example, a definition mask, a ghosting mask, and a semantic segmentation mask may be obtained; and fusion processing is performed on the third image and the fourth image based on the definition mask, the ghosting mask, and the semantic segmentation mask, to obtain the fused image.

Optionally, the third image and the fourth image may be images in the YUV color space, and fusion processing may be performed in the YUV color space. Fusion processing in the YUV color space imposes relatively small requirements on computing power; therefore, fusion processing is performed on the third image and the fourth image based on the at least two masks in the YUV color space, which can improve efficiency of fusion processing.

Optionally, the performing fusion processing on the third image and the fourth image based on at least two masks to obtain a fused image includes:

obtaining a target mask based on an intersection of the at least two masks; and performing fusion processing on the third image and the fourth image based on the target mask to obtain the fused image.

Figure 9:
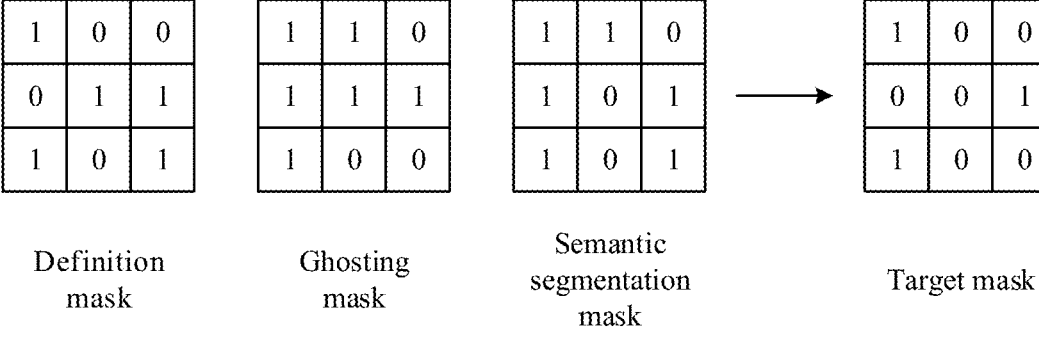
FIG. 9 is a schematic diagram of a target mask according to an embodiment of this application.

For example, a definition mask, a ghosting mask, and a semantic segmentation mask may be obtained; and the target mask may be obtained based on an intersection of the definition mask, the ghosting mask, and the semantic segmentation mask. As shown in FIG. 9, a position with a pixel of 1 in the definition mask may indicate that a confidence level of the definition of the third image being greater than the definition of the fourth image in this region is 1, and a position with a pixel of 0 in the definition mask may indicate that a confidence level of the definition of the third image being greater than the definition of the fourth image in this region is 0; a position with a pixel of 1 in the ghosting mask may indicate that a confidence level of this region in the third image being a ghosting region with respect to the fourth image is 1, and a position with a pixel of 0 in the ghosting mask may indicate that a confidence level of this region in the third image being a ghosting region with respect to the fourth image is 0; and a position with a pixel of 1 in the semantic segmentation mask may indicate that a confidence level of this region in the third image being a photographed object of a target type is 1, and a position with a pixel of 0 in the semantic segmentation mask may indicate that a confidence level of this region in the third image being a photographed object of a target type is 0. The target mask is obtained based on the intersection of the definition mask, the ghosting mask, and the semantic segmentation mask. For example, for a region with 1 in all the definition mask, the ghosting mask, and the semantic segmentation mask, a pixel value of the region corresponding to the target mask is 1; for a region with 0 in all the definition mask, the ghosting mask, and the semantic segmentation mask, a pixel value of the region corresponding to the target mask is 0; and for a region with 1 in part of the definition mask, the ghosting mask, and the semantic segmentation mask, a pixel value of the region corresponding to the target mask is 0.

Optionally, a local image region in the third image may be obtained based on the target mask; and fusion processing is performed on the fourth image and the local image region in the third image, so as to obtain the fused image.

For example, the target mask and the third image are multiplied pixel by pixel, and the local image region in the third image may be determined based on pixel values of different regions in the target mask. For example, a local image region in the third image corresponding to an image region with a pixel of 1 in the target mask may be obtained, and the fused image may be obtained through fusion processing on the fourth image and the local image region in the third image.

In this embodiment of this application, the electronic device may include the first camera module and the second camera module. The first camera module is a near-infrared camera module or an infrared camera module. The first camera module may capture the first image and the second camera module may capture the second image. Image processing is performed on the first image and the second image to obtain the third image and the fourth image, respectively. Fusion processing is performed on the third image and the fourth image based on at least two masks to obtain a fused image. Because the third image is a near-infrared image or an infrared image, the third image may include information that cannot be obtained from the fourth image. Through fusion processing on the third image and the fourth image, multi-spectrum information fusion on near-infrared light image information and visible light image information can be implemented to make the fused image include more detail information. In addition, fusion processing is performed on the third image and the fourth image based on the at least two masks, and image enhancement can be performed from at least two aspects such as sharpness, ghosting removal, or local details. In this way, image enhancement is implemented for the second image obtained by the second camera module (for example, the main-camera module) to enhance the detail information in the image and improve the image quality.

Figure 6:
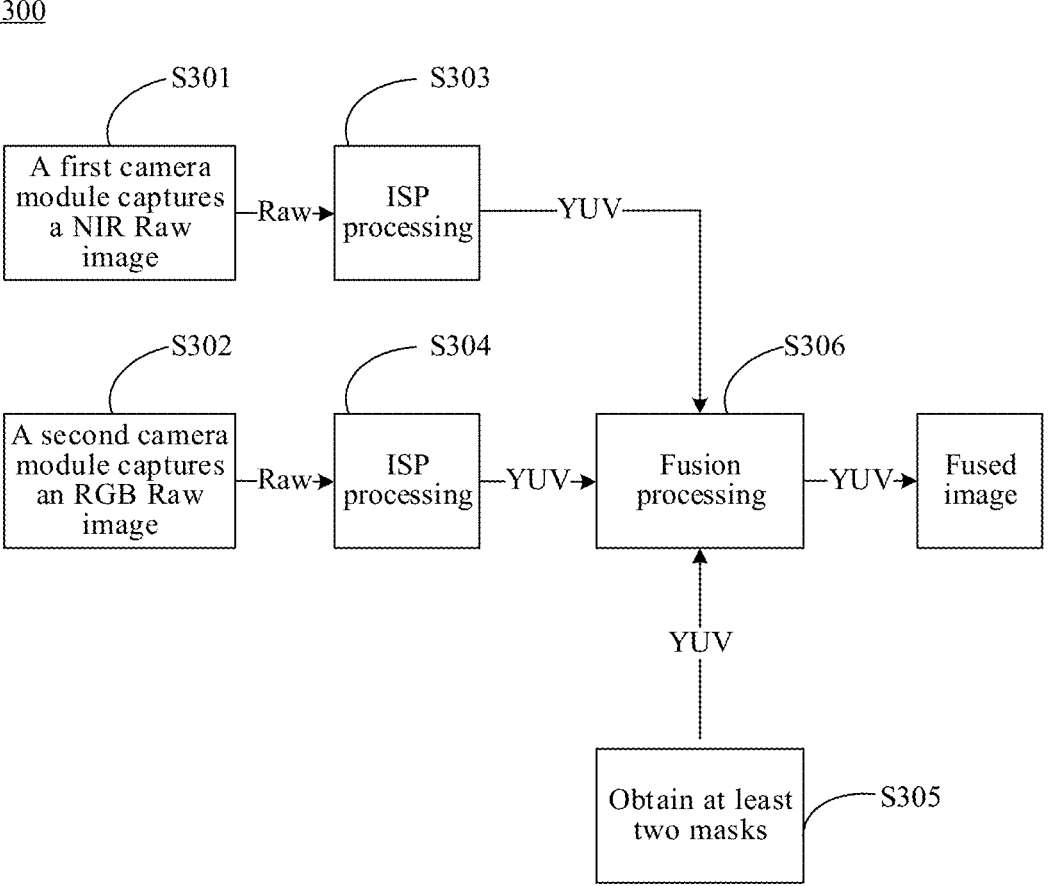
FIG. 6 is a schematic flowchart of an image processing method according to an embodiment of this application.

FIG. 6 is a schematic diagram of an image processing method according to an embodiment of this application. The image processing method can be executed by the electronic device shown in FIG. 1. The method 300 includes step S301 to step S306; and the following describes in detail step S301 to step S306.

It should be understood that the image processing method shown in FIG. 6 may be applied to the electronic device shown in FIG. 1, and the electronic device includes a first camera module and a second camera module. The first camera module is a near-infrared camera module or an infrared camera module (for example, an obtained spectral range is 700 nm to 1100 nm); and the second camera module may be a visible light camera module or other camera modules capable of obtaining visible light (for example, an obtained spectral range includes 400 nm to 700 nm).

Step S301: The first camera module captures a NIR Raw image (which is an example of a first image).

The NIR Raw image may be a NIR image in a Raw color space.

For example, the first camera module may be a near-infrared camera module or an infrared camera module. The first camera module may include a first lens, a first camera, and an image sensor, and a spectral range that can pass through the first lens is near-infrared light (700 nm to 1100 nm).

It should be understood that the first lens may be a filter lens, and the first lens may be used to absorb light in specific bands and allow light in near-infrared bands to pass through.

It should be further understood that, in this embodiment of this application, the NIR Raw image captured by the first camera module may be a single-channel image and the NIR Raw image may be used to represent intensity information of photons superimposed together. For example, the NIR Raw image may be a single-channel grayscale image.

Step S302: The second camera module captures an RGB Raw image (which is an example of a second image).

The RGB Raw image may be an RGB image in a Raw color space.

For example, the second camera module may be a visible light camera module or other camera modules capable of obtaining visible light (for example, an obtained spectral range is 400 nm to 700 nm). The second camera module may include a second lens, a second camera, and an image sensor, and a spectral range that can pass through the second lens includes visible light (400 nm to 700 nm).

Optionally, step S301 and step S302 may be performed simultaneously; that is, the first camera module and the second camera module may output frames at the same time to obtain NIR Raw images and RGB Raw images, respectively.

Step S303: Perform ISP processing on the image output in step S301.

Optionally, ISP processing is performed on the NIR Raw image to obtain an NIR image (which is an example of a third image).

Step S304: Perform ISP processing on the image output in step S302.

Optionally, ISP processing is performed on the RGB Raw image to obtain an RGB image (which is an example of a fourth image).

Optionally, step S303 and step S304 may have no timing sequence requirements. For example, step S303 and step S304 may alternatively be performed simultaneously.

Optionally, step S303 and step S304 may be partially the same or completely the same.

Optionally, ISP processing may include Raw algorithm processing, RGB algorithm processing, or YUV algorithm processing.

For example, Raw algorithm processing may include, but is not limited to:

black level correction (black level correction, BLC), lens shading correction (lens shading correction, LSC), auto white balance (auto white balance, AWB), demosaicing, or the like.

Black level correction is used to correct a black level; lens shading correction is used to eliminate inconsistency of colors and lightness between the periphery of the image and the center of the image due to a lens optical system; and automatic white balance is used to cause the camera to make a white object to present white at any color temperature.

It should be noted that black level correction, lens shading correction, automatic white balance, and demosaicing are used as examples for description above, and Raw algorithm processing is not limited in this application.

For example, RGB algorithm processing may include, but is not limited to:

color correction matrix-based processing, three-dimensional lookup table-based processing, or the like.

A color correction matrix (Color Correction Matrix, CCM) is used to calibrate accuracy of a color other than white. A three-dimensional lookup table (Look Up Table, LUT) are widely used in image processing; for example, the lookup table may be used for image color correction, image enhancement, image gamma correction, or the like. For example, a LUT may be loaded to an image signal processor, and image processing may be performed on an original image based on the LUT table to implement color style mapping from the original image to other images, so as to achieve different image effects.

It should be noted that color correction matrix-based processing and three-dimensional lookup table-based processing are used as examples for description above, and RGB image processing is not limited in this application.

For example, YUV algorithm processing may include, but is not limited to:

global tone mapping processing, gamma processing, or the like.

Global tone mapping (Global tone Mapping, GTM) is used to resolve a problem of uneven distribution of grayscale values in a high dynamic image. Gamma processing is used to adjust brightness, contrast, a dynamic range, and the like of an image by adjusting a gamma curve.

It should be noted that global tone mapping processing and gamma processing are used as examples for description above, and YUV image processing is not limited in this application.

Step S305: Obtain at least two masks.

Optionally, the at least two masks are a definition mask and a semantic segmentation mask. For example, fusion processing is performed on the third image and the fourth image based on the definition mask and the semantic segmentation mask, so as to obtain the fused image.

Optionally, the at least two masks may be a definition mask, a ghosting mask, and a semantic segmentation mask.

For example, the definition mask may be used to mark an image region with a better definition than that of the RGB image in the NIR image, a ghosting mask may be used to mark a ghosting region in the NIR image, and a semantic segmentation mask may be used to mark an image region in which a photographed object of a target type is located in the NIR image.

For example, the NIR image may be divided into blocks to obtain N NIR image blocks, and a variance A of each NIR image block in the N NIR image blocks may be calculated. The RGB image may be divided into blocks to obtain N RGB image blocks, and a variance B of each RGB image block in the N RGB image blocks is calculated. When a variance A of one NIR image block is greater than a variance B of a corresponding RGB image block, a definition mask corresponding to a position of the image block is 1, where 1 may be used to indicate that a confidence level of a definition of the NIR image being greater than a definition of the RGB image is 1. When a variance A of one NIR image block is less than or equal to a variance B of a corresponding RGB image block, a definition mask corresponding to a position of the image block is 0, where 0 may be used to indicate that a confidence level of a definition of the NIR image being greater than a definition of the RGB image is 0.

It should be understood that, in this embodiment of this application, the image region in the NIR image whose definition is better than that in the RGB image may be determined based on the definition mask; and fusion processing is performed on the RGB image and a local region (the image region whose definition is better than that in the RGB image) of the NIR image, so as to improve a definition of the fused image and improve the image quality of the fused image.

For example, ghosting detection may be performed on the NIR image and the RGB image to obtain a ghosting mask.

For example, filtering processing may be performed on the NIR image and the RGB image by using a Sobel operator to obtain a gradient image of the NIR image and a gradient image of the RGB image, where the gradient image is used to indicate a speed of change of texture information. The ghosting mask may be obtained based on a difference between the two gradient images.

It should be noted that the Sobel operator (Sobel operator) is mainly used for edge detection, and is a discrete differential operator that calculates an approximate value of a gradient of an image brightness function. A result of application of this operator at any point of the image is either a corresponding gradient vector or its norms.

It should be understood that in this embodiment of this application, a local image region (for example, a ghosting-free image region) may be selected from the NIR image based on the ghosting mask and fused with the RGB image, so as to avoid a ghosting region in the fused image and improve the image quality of the fused image.

In an example, a semantic segmentation image corresponding to the fourth image may be obtained, and some tags are selected from the semantic segmentation image to obtain a semantic segmentation mask. For example, the semantic segmentation image includes five tags, namely tag 0 to tag 4. Tag 0 is used to mark people; tag 1 is used to mark animals; tag 2 is used to mark plants (for example, green plants); tag 3 is used to mark distant scenery (for example, distant mountains); and tag 4 is used to mark the sky. Some tags may be selected from a plurality of tags in the semantic segmentation image, for example, image regions with tag 2 and tag 3 are marked as 1 and remaining image regions are marked as 0, so as to obtain a semantic segmentation mask.

It should be understood that for part of scenery (for example, green plants or distant mountains), the NIR image has more detail information. For example, because the green scene has a higher reflectance for near-infrared light, the NIR image has more detail information of the green plants than the RGB image. For example, near-infrared light has longer wavelength than visible light, and the near-infrared light features a stronger diffraction capability. In addition, light with longer wavelength has stronger penetration, and therefore a captured image has a stronger sense of transparency. Compared with the RGB image, the NIR image includes more detail information (for example, texture information of distant mountains) for distant scenery (for example, distant mountains). A local region (for example, an image region with more detail information) may be selected from the NIR image and fused with the RGB image, so as to enhance local detail information of the fused image and improve the image quality of the fused image.

Step S306: Perform fusion processing.

Optionally, fusion processing is performed on the NIR image and the RGB image based on at least two masks to obtain a fused image.

It should be understood that performing fusion processing on the NIR image and the RGB image based on the at least two masks may be performing image enhancement from at least two aspects, such as definition, ghosting removal, or local details, so as to implement image enhancement on the RGB image, enhance the detail information of the image, and improve the image quality.

Optionally, when the electronic device is in a non-dark scene (for example, an ambient brightness of a photographing environment in which the electronic device is located is greater than or equal to a second preset threshold), steps S301 to S306 may be performed to execute the image processing method provided in this embodiment of this application.

Figure 7:
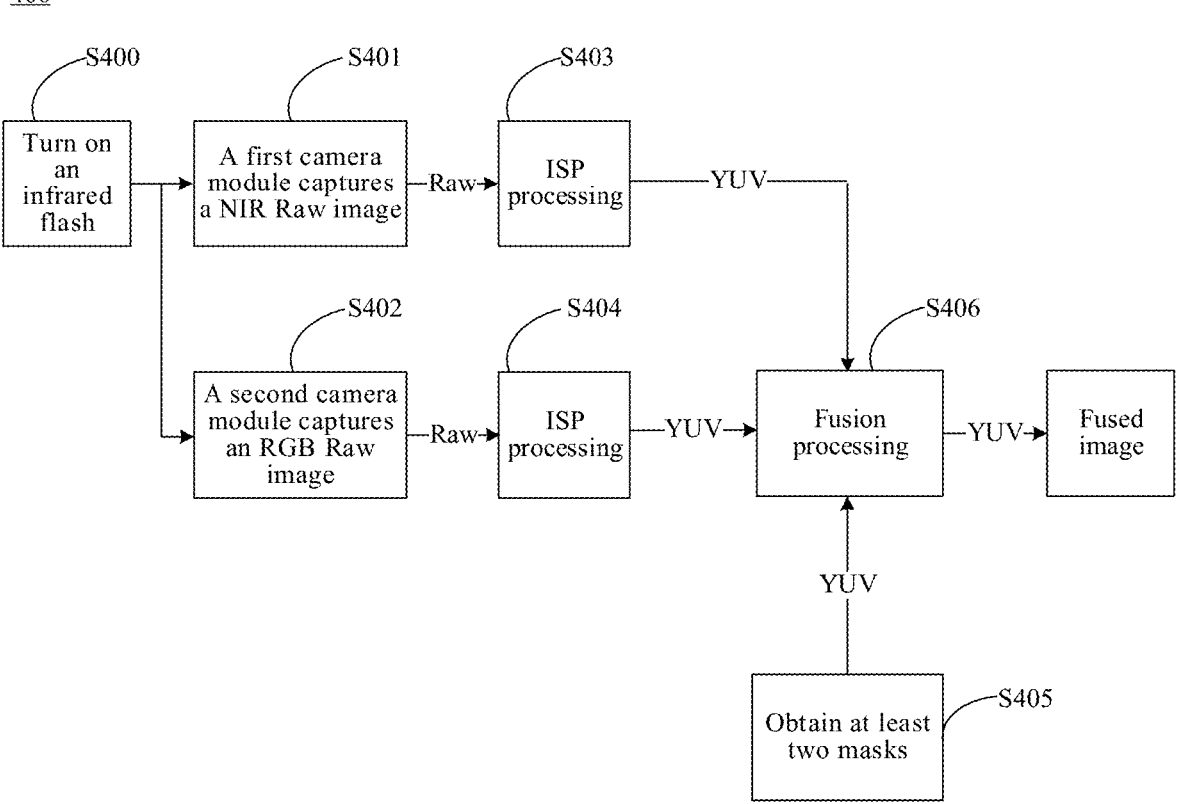
FIG. 7 is a schematic flowchart of an image processing method according to an embodiment of this application.

Optionally, the electronic device may further include an infrared flash. When the electronic device is in a dark light scene, that is, when the ambient brightness of the photographing environment in which the electronic device is located is less than the second preset threshold (which, for example, may be determined based on a lightness value), the electronic device may execute the method 400 shown in FIG. 7. For example, step S400 may be executed to turn on the infrared flash. After the infrared flash is turned on, a NIR Raw image may be obtained by the first camera module, an RGB Raw image may be obtained by the second camera module, and step S401 to step S406 shown in FIG. 7 are performed. It should be understood that related descriptions of step S301 to step S306 are applicable to step S401 to step S406, and details are not repeated herein.

Optionally, a greater lightness value of the electronic device indicates a higher ambient brightness of the electronic device. The ambient brightness of the photographing environment in which the electronic device is located may be determined based on the lightness value of the electronic device. When the lightness value of the electronic device is less than the second preset threshold, the electronic device may turn on the infrared flash.

The lightness value is used for estimating ambient brightness, and its specific calculation formula is as follows:

$$LV = 10 * \log_2\left(\frac{\text{Aperture}^2}{\text{Exposure}} * \frac{100}{Iso} * \frac{Luma}{46}\right);$$

where

Exposure is an exposure time, Aperture is an aperture size, Iso is light sensitivity, and Luma is an average value of Y in an XYZ space of an image.

For example, in a dark light scene, the electronic device may perform focusing first after detecting a shooting indication, and performs scene detection simultaneously. After the dark light scene is identified and focusing is completed, the infrared flash may be turned on. After the infrared flash is turned on, frames of the NIR Raw image and the RGB Raw image may be output simultaneously.

It should be understood that in the dark light scene with a low ambient brightness of the shooting environment in which the electronic device is located, after the electronic device turns on the infrared flash, reflected light obtained by the first camera module may be increased, so that light intake of the first camera module is increased and the NIR Raw image captured by the first camera module has a higher definition. The NIR Raw image with a higher definition increases a definition of the NIR image, and the NIR image with a higher definition further increases a definition of the fused image.

In this embodiment of this application, the electronic device may include the first camera module and the second camera module. The first camera module is a near-infrared camera module or an infrared camera module. The first camera module may capture the NIR Raw image and the second camera module may capture the RGB Raw image. Image processing is performed on the NIR Raw image and the RGB Raw image to obtain the NIR image and the RGB image, respectively. Fusion processing is performed on the NIR image and the RGB image based on at least two masks to obtain a fused image. Because the NIR image is a near-infrared image or an infrared image, the NIR image may include information that cannot be obtained from the RGB image. Through fusion processing on the NIR image and the RGB image, multi-spectrum information fusion on near-infrared light image information and visible light image information can be implemented to make the fused image include more detail information. In addition, fusion processing on the NIR image and the RGB image is performed based on the at least two masks, and image enhancement can be performed from at least two aspects such as sharpness, ghosting removal, or local details. In this way, image enhancement is implemented for the RGB image obtained by the second camera module (for example, the main-camera module) to enhance the detail information in the image and improve the image quality.

Figure 8:
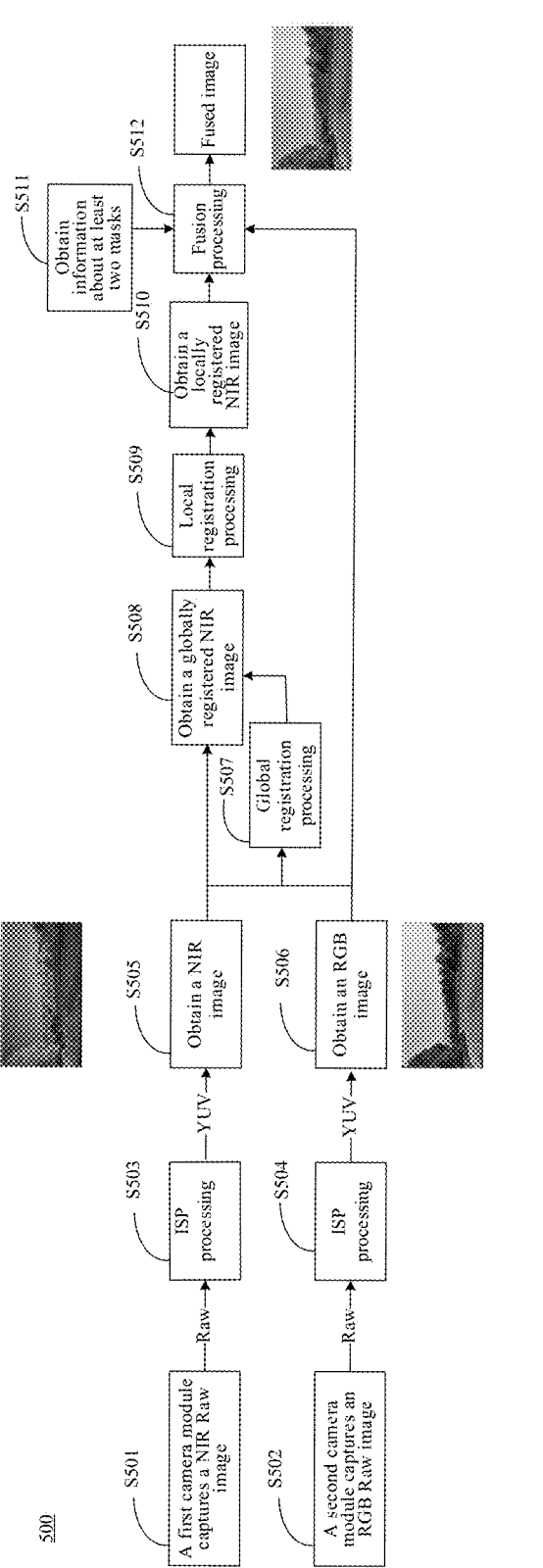
FIG. 8 is a schematic flowchart of an image processing method according to an embodiment of this application.

FIG. 8 is a schematic diagram of an image processing method according to an embodiment of this application. The image processing method can be executed by the electronic device shown in FIG. 1. The method 500 includes step S501 to step S512; and the following describes in detail step S501 to step S512.

It should be understood that the image processing method shown in FIG. 8 may be applied to the electronic device shown in FIG. 1, and the electronic device includes a first camera module and a second camera module. The first camera module is a near-infrared camera module or an infrared camera module (for example, an obtained spectral range is 700 nm to 1100 nm); and the second camera module may be a visible light camera module or other camera modules capable of obtaining visible light (for example, an obtained spectral range includes, but is not limited to, 400 nm to 700 nm).

Step S501: The first camera module captures a NIR Raw image (which is an example of a first image).

The NIR Raw image may be a NIR image in a Raw color space.

For example, the first camera module may be a near-infrared camera module or an infrared camera module. The first camera module may include a first lens, a first camera, and an image sensor, and a spectral range that can pass through the first lens is near-infrared light (700 nm to 1100 nm).

It should be understood that the first lens may be a filter lens, and the first lens may be used to absorb light in specific bands and allow light in near-infrared bands to pass through.

It should be further understood that, in this embodiment of this application, the NIR Raw image captured by the first camera module may be a single-channel image and the NIR Raw image may be used to represent intensity information of photons superimposed together. For example, the NIR Raw image may be a single-channel grayscale image.

Step S502: The second camera module captures an RGB Raw image (which is an example of a second image).

The RGB Raw image may be an RGB image in a Raw color space.

For example, the second camera module may be a visible light camera module or other camera modules capable of obtaining visible light (for example, an obtained spectral range is 400 nm to 700 nm). The second camera module may include a second lens, a second camera, and an image sensor, and a spectral range that can pass through the second lens includes, but is not limited to, visible light (400 nm to 700 nm).

Optionally, step S501 and step S502 may be performed simultaneously; that is, the first camera module and the second camera module may output frames at the same time to obtain NIR Raw images and RGB Raw images, respectively.

Step S503: Perform ISP processing on the image output in step S501.

Optionally, ISP processing is performed on the NIR Raw image.

Step S504: Perform ISP processing on the image output in step S502.

Optionally, ISP processing is performed on the RGB Raw image.

Optionally, step S503 and step S504 may have no timing sequence requirements. For example, step S503 and step S504 may alternatively be performed simultaneously.

Optionally, step S503 and step S504 may be partially the same or completely the same.

Optionally, ISP processing may include Raw algorithm processing, RGB algorithm processing, or YUV algorithm processing.

For example, Raw algorithm processing may include, but is not limited to:

black level correction (black level correction, BLC), lens shading correction (lens shading correction, LSC), auto white balance (auto white balance, AWB), demosaicing, or the like.

Black level correction is used to correct a black level; lens shading correction is used to eliminate inconsistency of colors and lightness between the periphery of the image and the center of the image due to a lens optical system; and automatic white balance is used to cause the camera to make a white object to present white at any color temperature.

It should be noted that black level correction, lens shading correction, automatic white balance, and demosaicing are used as examples for description above, and Raw algorithm processing is not limited in this application.

For example, RGB algorithm processing may include, but is not limited to:

color correction matrix-based processing, three-dimensional lookup table-based processing, or the like.

A color correction matrix (Color Correction Matrix, CCM) is used to calibrate accuracy of a color other than white. A three-dimensional lookup table (Look Up Table, LUT) are widely used in image processing; for example, the lookup table may be used for image color correction, image enhancement, image gamma correction, or the like. For example, a LUT may be loaded to an image signal processor, and image processing may be performed on an original image based on the LUT table to implement color style mapping from the original image to other images, so as to achieve different image effects.

It should be noted that color correction matrix-based processing and three-dimensional lookup table-based processing are used as examples for description above, and RGB image processing is not limited in this application.

For example, YUV algorithm processing may include, but is not limited to:

global tone mapping processing, gamma processing, or the like.

Global tone mapping (Global tone Mapping, GTM) is used to resolve a problem of uneven distribution of grayscale values in a high dynamic image. Gamma processing is used to adjust brightness, contrast, a dynamic range, and the like of an image by adjusting a gamma curve.

It should be noted that global tone mapping processing and gamma processing are used as examples for description above, and YUV image processing is not limited in this application.

Optionally, the foregoing step S503 is an example for description, and the NIR image may alternatively be obtained by using other methods; and the foregoing step S504 is an example for description, and the RGB image may alternatively be obtained by using other methods. This is not limited in this application.

Step S505: Obtain a NIR image (which is an example of a fifth image).

Optionally, the NIR image may be a NIR image in the YUV color space.

Step S506: Obtain an RGB image (which is an example of a fourth image).

Optionally, the RGB image may be an RGB image in the YUV color space.

Step S507: Perform global registration processing.

It should be understood that the first camera module and the second camera module are disposed at different positions in the electronic device, and therefore a specific baseline distance is present between the first camera module and the second camera module. To be specific, there is a specific parallax between an image captured by the first camera module and an image captured by the second camera module. A parallax between the NIR image and the RGB image can be eliminated through global registration processing.

Optionally, global registration processing uses the RGB image as a benchmark, and the entire NIR image being mapped to a coordinate system of the RGB image is used as an example for description. Alternatively, global registration processing uses the NIR image as a benchmark, and the RGB image is mapped to a coordinate system of the NIR image.

Optionally, a target pixel position in the RGB image may be selected based on depth information; based on the target pixel position, target feature points in the RGB image is obtained; and then global registration processing is performed on the NIR image by using the target feature points in the RGB image as a benchmark. Optionally, for a specific procedure of global registration processing, refer to FIG. 10.

It should be understood that the feature point is a point with sharply changing grayscale values in the image, or a point with a relatively large curvature on an edge of the image. The target feature point may be a feature point satisfying a preset condition in RGB, for example, the target feature point may be a feature point whose depth information is greater than the first preset thresholds in the RGB image.

In this embodiment of this application, global registration processing may be performed based on the depth information. The NIR image has better effects than the RGB image not at all pixel positions, for example, for a near scene of a photographed object, detail information in the NIR image is less than detail information in the RGB image. If a relatively large quantity of feature points corresponding to the near scene are extracted from the NIR image, registration cannot be implemented successfully on the distant scene in the NIR image and the RGB image, and consequently the fused image is prone to a ghosting problem. Therefore, during global registration on the NIR image, target pixel positions in the RGB image may be selected based on the depth information; target feature points of the RGB image may be obtained based on the target pixel positions in the RGB image; and then global registration processing is performed on the NIR image by using the target feature points of the fourth image as a benchmark.

Step S508: Obtain a globally registered NIR image (which is an example of a sixth image).

Step S509: Perform local registration processing.

Optionally, local registration processing is performed on the globally registered NIR images.

In this embodiment of this application, local registration processing may be further performed on a basis of global registration processing, so that image registration processing is further performed on local details in the globally registered NIR image, thereby improving local detail information of the fused image.

Step S510: Obtain a locally registered NIR image (which is an example of a third image).

Figure 11:
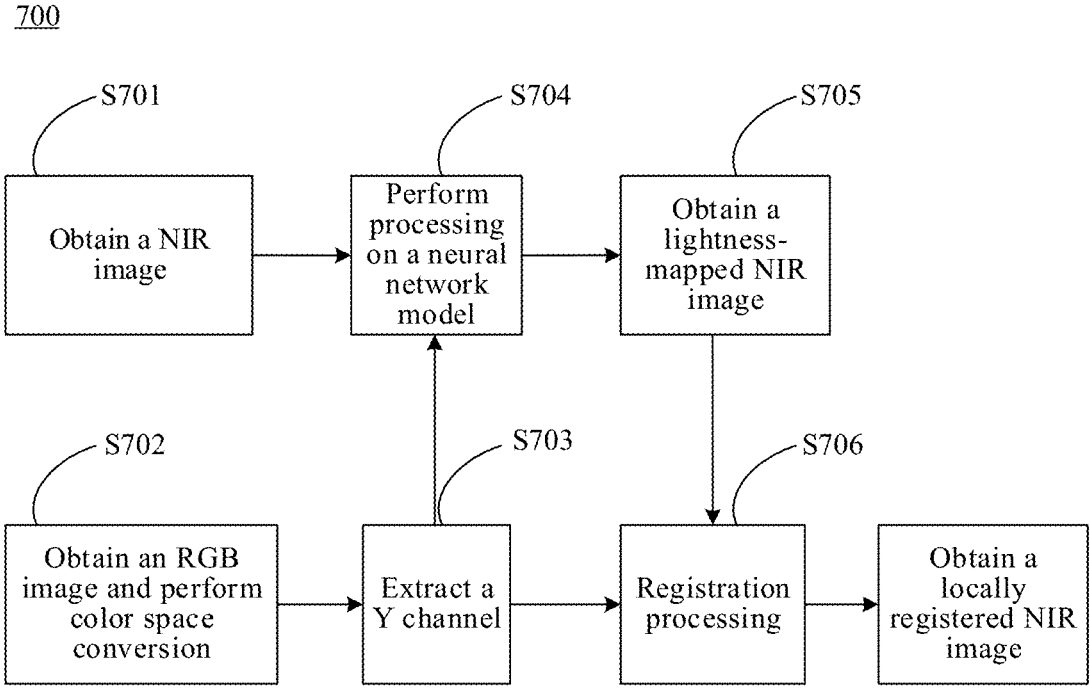
FIG. 11 is a schematic flowchart of a local registration method according to an embodiment of this application.
Figure 12:
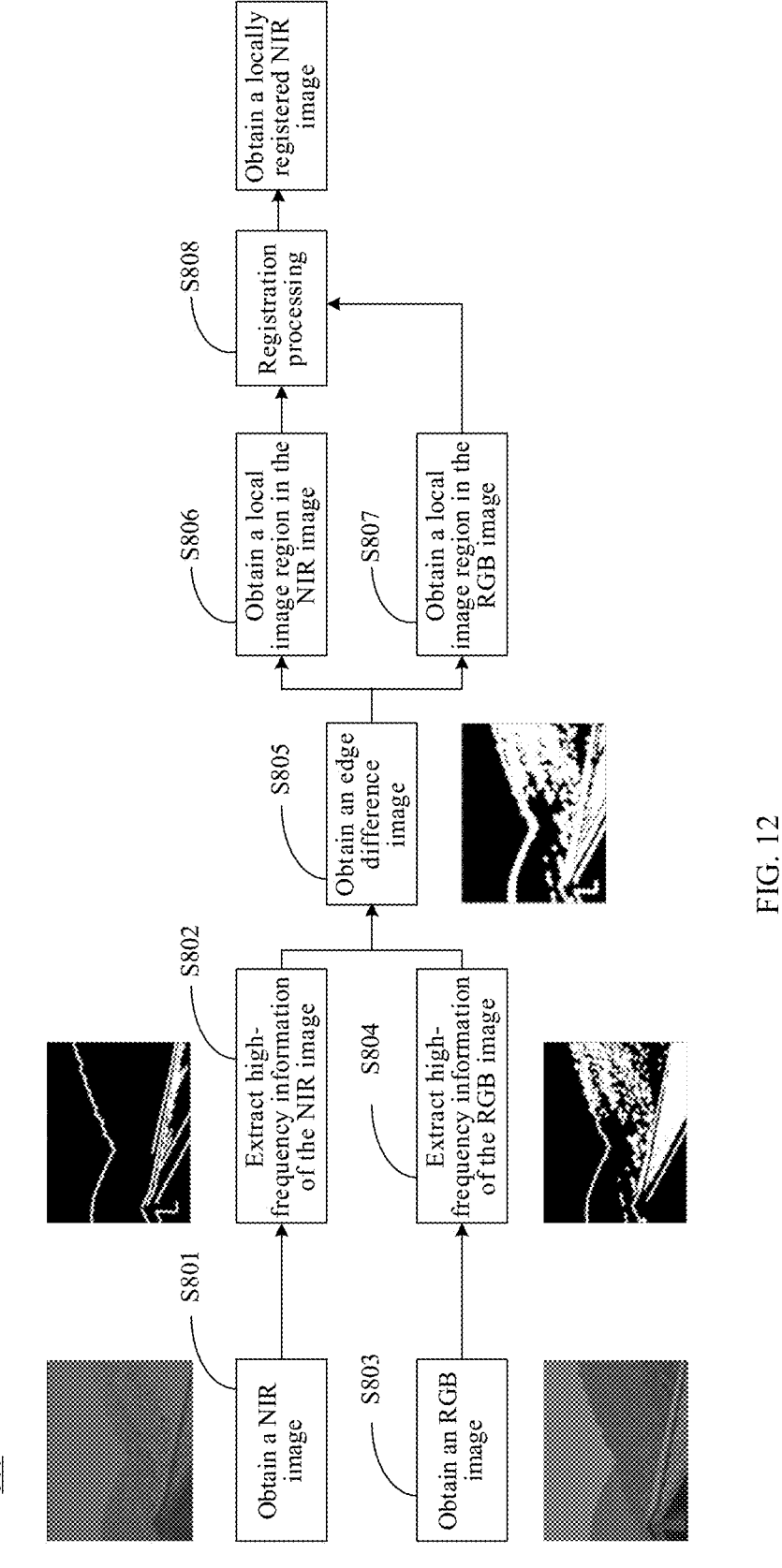
FIG. 12 is a schematic flowchart of a local registration method according to an embodiment of this application.

Optionally, local registration processing may be performed on the globally registered NIR image by using the local registration method shown in FIG. 11 or FIG. 12 to obtain the locally registered NIR image.

Step S511: Obtain at least two masks.

It should be understood that information about the at least two masks may be obtained in this embodiment of this application; during fusion processing on the NIR image and the RGB image, fusion processing may be performed based on the information about the at least two masks; and image enhancement may be performed from at least two aspects, such as definition, ghosting removal, or local details, so as to improve the image quality of the fused image.

Optionally, in this embodiment of this application, the at least two masks may include, but are not limited to, at least two of a definition mask, a ghosting mask, or a semantic segmentation mask.

It should be understood that in this embodiment of this application, not all pixels in the NIR image have a better definition than those in the RGB image, and therefore an image region with a better definition than that of the RGB image may be obtained from the NIR image by using the definition mask. The image region is then fused with the RGB image, so as to improve a definition of the fused image.

It should also be understood that in this embodiments of this application, some regions of the NIR image and the RGB image cannot be registered successfully even after global registration processing and local registration processing; therefore, the ghosting mask may be used to eliminate a region of the NIR image on which registration cannot be implemented successfully with the RGB image. Further, fusion processing is performed on the NIR image and the RGB image based on the ghosting mask, to effectively reduce a ghosting region in the fused image.

It should be understood that in this embodiment of this application, due to different reflectance of near-infrared light for different types of objects, different objects in the NIR image include different detail information; therefore, an image region of a photographed object of a target category may be obtained from the NIR image based on the semantic segmentation mask; and fusion processing is then performed on the image region and the RGB image, to improve local detail information of the fused image.

Optionally, a definition mask and a semantic segmentation mask may be obtained; and based on the definition mask and the semantic segmentation mask, fusion processing is performed on the locally registered NIR image and the RGB image.

Optionally, a definition mask, a ghosting mask, and a semantic segmentation mask may be obtained; and based on the definition mask, the ghosting mask, and the semantic segmentation mask, fusion processing is performed on the locally registered NIR image and the RGB image.

For example, the definition mask, the ghosting mask, and the semantic segmentation mask may be obtained; and a target mask may be obtained based on an intersection of the definition mask, the ghosting mask, and the semantic segmentation mask, as shown in FIG. 9, and details are not repeated herein. Fusion processing is performed on the locally registered NIR image (which is an example of the third image) and the RGB image (which is an example of the fourth image) based on the target mask.

In this embodiment of this application, local image regions of the NIR image that are better than those in the RGB image may be marked in the NIR image by using the definition mask; a ghosting-free local region or a ghosting region of the NIR image may be marked in the NIR image by using the ghosting mask; and local image regions with more detail information in the NIR image may be marked in the NIR image by using a semantic segmentation image.

For example, the NIR image may be divided into blocks to obtain N NIR image blocks, and a variance A of each NIR image block in the N NIR image blocks may be calculated. The RGB image may be divided into blocks to obtain N RGB image blocks, and a variance B of each RGB image block in the N RGB image blocks is calculated. When a variance A of one NIR image block is greater than a variance B of a corresponding RGB image block, a definition mask corresponding to a position of the image block is 1, where 1 may be used to indicate that a confidence level of a definition of the NIR image being greater than a definition of the RGB image is 1. When a variance A of one NIR image block is less than or equal to a variance B of a corresponding RGB image block, a definition mask corresponding to a position of the image block is 0, where 0 may be used to indicate that a confidence level of a definition of the NIR image being greater than a definition of the RGB image is 0.

It should be understood that, in this embodiment of this application, the image region in the NIR image whose definition is better than that in the RGB image may be determined based on the definition mask; and fusion processing is performed on the RGB image and a local region (the image region whose definition is better than that in the RGB image) of the NIR image, so as to improve a definition of the fused image and improve the image quality of the fused image.

For example, ghosting detection may be performed on the NIR image and the RGB image to obtain a ghosting mask.

For example, filtering processing may be performed on the NIR image and the RGB image by using a Sobel operator to obtain a gradient image of the NIR image and a gradient image of the RGB image, where the gradient image is used to indicate a speed of change of texture information. The ghosting mask may be obtained based on a difference between the two gradient images.

It should be noted that the Sobel operator (Sobel operator) is mainly used for edge detection, and is a discrete differential operator that calculates an approximate value of a gradient of an image brightness function. A result of application of this operator at any point of the image is either a corresponding gradient vector or its norms.

It should be understood that in this embodiment of this application, a local image region (for example, a ghosting-free image region) may be selected from the NIR image based on the ghosting mask and fused with the RGB image, so as to avoid a ghosting region in the fused image and improve the image quality of the fused image.

In an example, some tags are selected from the semantic segmentation image to obtain a semantic segmentation mask. For example, the semantic segmentation image includes five tags, namely tag 0 to tag 4. Tag 0 is used to mark people; tag 1 is used to mark animals; tag 2 is used to mark plants (for example, green plants); tag 3 is used to mark distant scenery (for example, distant mountains); and tag 4 is used to mark the sky. Some tags may be selected from a plurality of tags in the semantic segmentation image, for example, image regions with tag 2 and tag 3 are marked as 1 and remaining image regions are marked as 0, so as to obtain a semantic segmentation mask.

It should be understood that for part of scenery (for example, green plants or distant mountains), the NIR image has more detail information. For example, because the green scene has a higher reflectance for near-infrared light, the NIR image has more detail information of the green plants than the RGB image. For example, near-infrared light has longer wavelength than visible light, and the near-infrared light features a stronger diffraction capability. In addition, light with longer wavelength has stronger penetration, and therefore a captured image has a stronger sense of transparency. Compared with the RGB image, the NIR image includes more detail information (for example, texture information of distant mountains) for distant scenery (for example, distant mountains). A local region (for example, an image region with more detail information) may be selected from the NIR image and fused with the RGB image, so as to enhance local detail information of the fused image and improve the image quality of the fused image.

Step S512: Perform fusion processing.

Optionally, fusion processing is performed on the locally registered NIR image (which is an example of the third image) and the RGB image (which is an example of the fourth image) based on the at least two masks to obtain the fused image.

In this embodiment of this application, the electronic device may include the first camera module and the second camera module. The first camera module is a near-infrared camera module or an infrared camera module. The first camera module may capture the NIR Raw image and the second camera module may capture the RGB Raw image. Image processing is performed on the NIR Raw image and the RGB Raw image to obtain the NIR image and the RGB image, respectively. Fusion processing is performed on the NIR image and the RGB image based on at least two masks to obtain a fused image. Because the NIR image is a near-infrared image or an infrared image, the NIR image may include information that cannot be obtained from the RGB image. Through fusion processing on the NIR image and the RGB image, multi-spectrum information fusion on near-infrared light image information and visible light image information can be implemented to make the fused image include more detail information. In addition, fusion processing on the NIR image and the RGB image is performed based on the at least two masks, and image enhancement can be performed from at least two aspects such as sharpness, ghosting removal, or local details. In this way, image enhancement is implemented for the RGB image obtained by the second camera module (for example, the main-camera module) to enhance the detail information in the image and improve the image quality.

Global registration processing in step S507 shown in FIG. 8 is described below by using an example.

Figure 10:
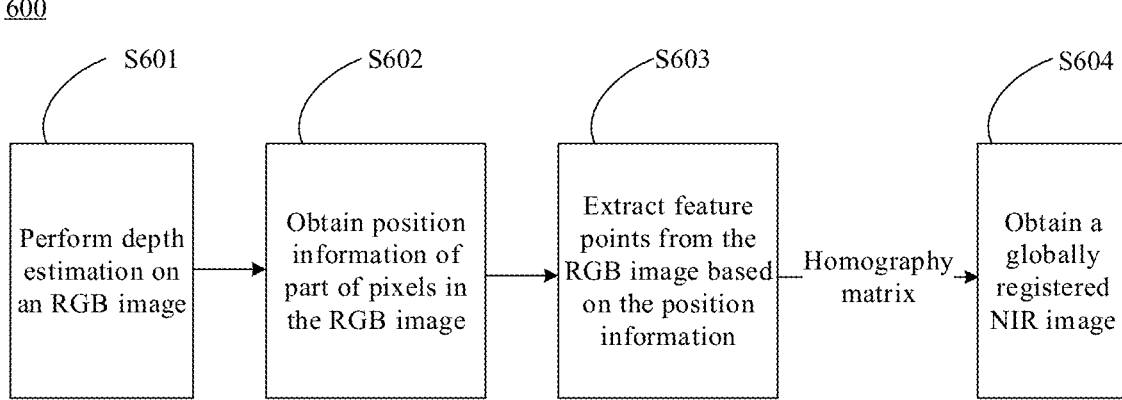
FIG. 10 is a schematic flowchart of a global registration method according to an embodiment of this application.

FIG. 10 is a schematic diagram of a global registration method according to an embodiment of this application. The method 600 includes step S601 to step S604. The following describes step S601 to step S604 in detail.

Step S601: Perform depth estimation on an RGB image.

Optionally, depth estimation is performed on the RGB image to obtain depth information.

It should be understood that depth estimation may be estimation on distance information of each pixel in the image relative to a camera module.

Optionally, the depth information of the RGB image may be obtained by using a depth estimation algorithm. A near-scene region and the distant-scene region in the RGB image may be distinguished by using the depth information of the RGB image.

For example, the depth estimation algorithm is an algorithm for obtaining distance information from each point in the scene in the image to a camera; and the depth estimation algorithm may include a monocular depth estimation algorithm, a binocular depth estimation algorithm, and the like.

Step S602: Obtain position information of part of pixels in the RGB image.

Optionally, the position information of the part of pixels in the RGB image is obtained based on the depth information.

Optionally, the depth information may be compared with a first preset threshold, so as to determine position information of part of pixels whose depth information is greater than the first preset threshold in the RGB image.

Step S603: Extract feature points from the RGB image based on the position information.

Optionally, part of feature points in a NIR image may alternatively be extracted based on the position information; or depth estimation is performed on a NIR image to obtain depth information of the NIR image, and positions of part of pixels whose depth information is greater than the first preset threshold in the NIR image are determined based on the depth information of the NIR image, which is not limited in this application.

Step S604: Obtain a globally registered NIR image.

Optionally, registration processing is performed on part of the feature points in the NIR image by using part of the feature points in the RGB image as a benchmark, so as to obtain a globally registered NIR image.

It should be understood that global registration processing aims to prevent ghosting regions from occurring in the fused image during fusion processing on the NIR image and the RGB image. Because image details of a distant-scene region for the photographed object in the NIR image are better than image details of a distant-scene region for the photographed object in the RGB image, and image details of a near-scene region for the photographed object in the RGB image are better than image details of a near-scene region for the photographed object in the NIR image, an image region corresponding to the distant-scene region may be selected from the NIR image and fused with the RGB image. During global registration on the NIR image, the near-scene region for the photographed object in the NIR image may not be considered, and registration processing is performed on the distant-scene region for the photographed object in the NIR image and the distant-scene region for the photographed object in the RGB image, so as to implement global registration on the NIR image and the RGB image.

Optionally, part of feature points in the NIR image and part of feature points in the RGB image are extracted, and the part of feature points in the NIR image are mapped to the part of feature points in the RGB image by using a homography matrix.

Optionally, the local registration processing method in step S509 shown in FIG. 8 may be as shown in FIG. 11.

In this embodiment of this application, a lightness of the globally registered NIR image may be quite different from a lightness of the RGB image, if fusion processing is directly performed on the globally registered NIR image and the RGB image, a fused image may be prone to lightness distortion. For example, the fused image may turn gray, or the fused image may have unnatural colors. In this case, local registration processing may be performed on the globally registered NIR image, that is, lightness processing may be performed on the globally registered NIR image, so as to make the lightness of the globally registered NIR image close to that of the RGB image. Due to the lightness of the NIR image being close to the brightness of the RGB image, colors of the fused image after fusion processing are more accurate, thereby improving the image quality.

FIG. 11 is a schematic diagram of a local registration method according to an embodiment of this application. The method 700 includes step S701 to step S706. The following describes step S701 to step S706 in detail.

Step S701: Obtain a NIR image (which is an example of a fifth image).

Optionally, a NIR Raw image may be captured by a first camera module; and image processing is performed on the NIR Raw image to obtain a NIR image.

For example, the first camera module may be a near-infrared camera module, or the first camera module may be an infrared camera module.

For example, the first camera module may include a first lens, a first camera, and an image sensor, and a spectral range that can pass through the first lens is near-infrared light (700 nm to 1100 nm).

It should be understood that the first lens may be a filter lens, and the first lens may be used to absorb light in specific bands and allow light in near-infrared bands to pass through.

Step S702: Obtain an RGB image and perform color space conversion.

Optionally, an RGB image is obtained and color space conversion is performed to obtain a YUV image.

It should be understood that local registration may be performed based on a lightness value of the image. Therefore, the RGB image needs to be converted to another color space supporting extraction of lightness-channel images, so as to obtain a lightness-channel image corresponding to the RGB image.

Optionally, an RGB Raw image may be captured by a second camera module, and image processing is performed on the RGB Raw image to obtain an RGB image; and the RGB image is converted into YUV color space, so as to obtain a YUV image.

For example, the second camera module may be a visible light camera module, or the second camera module may be other camera modules capable of obtaining visible light, which is not limited in this application.

For example, the second camera module may include a second lens, a second camera, and an image sensor, and a spectral range that can pass through the second lens is visible light (400 nm to 700 nm) or a spectral range that can pass through the second lens includes, but is not limited to, visible light (400 nm to 700 nm).

It should be understood that the second lens may be a filter lens, and the first lens may be used to absorb light in specific bands and allow light in visible light bands to pass through.

Step S703: Extract a Y channel.

Optionally, a Y channel of the YUV image is extracted.

Step S704: Perform processing on a neural network model.

Optionally, lightness processing is performed on the NIR image by using the neural network model.

It should be understood that local registration processing may be usually performed on the image by using an optical flow map, and accuracy of the optical flow map may be affected by grayscale. For a same shooting scene (for example, a scene of green plants), a grayscale of the RGB image may be below 150 and a grayscale of the NIR image may be above 200, featuring a large grayscale difference between the RGB image and the NIR image for the same shooting scene. The lightness of the NIR image may be processed by using the neural network model, so as to reduce a lightness grayscale of a region whose lightness grayscale is excessively high and increase a lightness grayscale of a region whose lightness grayscale is excessively low.

Optionally, the neural network model may be a neural network pre-trained by using a back-propagation algorithm.

Step S705: Obtain a lightness-mapped NIR image.

It should be understood that the lightness-mapped NIR image has consistent image content with the NIR image, and the lightness-mapped NIR image has consistent image lightness with the RGB image.

Step S706: Perform registration processing.

Optionally, registration processing is performed on the lightness-mapped NIR image by using a Y-channel image as a benchmark, so as to obtain a locally registered NIR image (which is an example of a third image).

In this embodiment of this application, registration processing is performed on the lightness of the NIR image and the lightness of the RGB image, so as to make the lightness of the NIR image close to the lightness of the RGB image for the same photographed object. For example, mapping processing may be performed on the lightness of the NIR image to obtain a lightness-mapped NIR image. A lightness channel corresponding to the RGB image may be obtained, and registration processing is performed on the lightness-mapped NIR image and the lightness channel of the RGB image. Due to the lightness of the NIR image being close to the brightness of the RGB image, colors of the fused image after fusion processing are more accurate, thereby improving the image quality.

Optionally, the local registration processing method in step S509 shown in FIG. 8 may be as shown in FIG. 12.

In this embodiment of this application, because the globally registered NIR image may be different from the RGB image at edge regions, if fusion processing is directly performed on the globally registered NIR image and the RGB image, ghosting may occur at edge regions of the fused image. Therefore, local registration processing may be performed on the edge regions of the globally registered NIR image, so as to reduce ghosting in the edge regions of the fused image.

FIG. 12 is a schematic diagram of a local registration processing method according to an embodiment of this application. The method 800 includes step S801 to step S808. The following describes step S801 to step S808 in detail.

Step S801: Obtain a NIR image (which is an example of a fifth image).

For example, a NIR Raw image may be captured by a first camera module; and image processing is performed on the NIR Raw image to obtain a NIR image. The first camera module may be a near-infrared camera module, or the first camera module may be an infrared camera module.

For example, the first camera module may include a first lens, a first camera, and an image sensor, and a spectral range that can pass through the first lens is near-infrared light (700 nm to 1100 nm).

It should be understood that the first lens may be a filter lens, and the first lens may be used to absorb light in specific bands and allow light in near-infrared bands to pass through.

Step S802: Extract high-frequency information of the NIR image.

It should be understood that the high-frequency information of the image refers to a region with sharply changing grayscale values in the image; for example, the high-frequency information in the image includes edge information, texture information, and the like of an object.

Step S803: Obtain an RGB image (which is an example of a fourth image).

For example, an RGB Raw image may be captured by a second camera module; and image processing is performed on the RGB Raw image to obtain an RGB image. The second camera module may be a visible light camera module, or the second camera module may be other camera modules, which is not limited in this application.

For example, the second camera module may include a second lens, a second camera, and an image sensor, and a spectral range that can pass through the second lens is visible light (400 nm to 700 nm) or a spectral range that can pass through the second lens includes, but is not limited to, visible light (400 nm to 700 nm) or other light.

Step S804: Extract high-frequency information of the RGB image.

It should be understood that the high-frequency information of the image refers to a region with sharply changing grayscale values in the image; for example, the high-frequency information in the image includes edge information, texture information, and the like of an object.

Step S805: Obtain an edge difference image.

Optionally, the edge difference image (an example of a seventh image) is obtained based on the high-frequency information of the NIR image and the high-frequency information of the RGB image.

The edge difference image is used to represent all the high-frequency information of the NIR image and the RGB image.

Optionally, the edge difference image may be obtained based on a union of the high-frequency information of the NIR image and the high-frequency information of the RGB image.

Step S806: Obtain a local image region in the NIR image.

Optionally, the local image region (which is an example of a first image region) in the NIR image is obtained based on the edge difference image.

Optionally, the edge difference image may be multiplied by the NIR image to obtain a local region in the NIR image.

For example, multiplying the edge difference image by the NIR image may be multiplying the edge difference image by pixel values of corresponding pixels in the NIR image.

Step S807: Obtain a local image region in the RGB image.

Optionally, the local image region (which is an example of a second image region) in the RGB image is obtained based on the edge difference image.

Optionally, the edge difference image may be multiplied by the RGB image to obtain a local region in the RGB image.

For example, multiplying the edge difference image by the RGB image may be multiplying the edge difference image by pixel values of corresponding pixels in the RGB image.

Step S808: Perform registration processing.

Optionally, registration processing is performed on the local image region in the NIR image by using the local image region in the RGB image as a benchmark, so as to obtain a locally registered NIR image (which is an example of a third image).

In this embodiment of this application, the high-frequency information in the NIR image and the RGB image is obtained, so as to obtain the edge difference image. The edge difference image includes all the high-frequency information in the NIR image and the RGB image, and the edge difference image may be used for obtaining the local image region from both the NIR image and the RGB image. Registration processing is then performed on the two local regions, for example, registration processing is performed on the local region in the NIR image by using the local image region in the RGB image as a benchmark, so as to implement registration between the high-frequency information in the NIR image and the high-frequency information in the RGB image, thereby avoiding ghosting in the fused image to some extent.

Optionally, step S801 to step S808 shown in FIG. 12 may alternatively be further processed after step S706 shown in FIG. 11. To be specific, lightness processing may be performed on the globally registered NIR image by using the method shown in FIG. 11; and edge region registration is further performed on the lightness-processed NIR image by using the method shown in FIG. 12, so as to obtain the locally registered NIR image.

Figure 13:
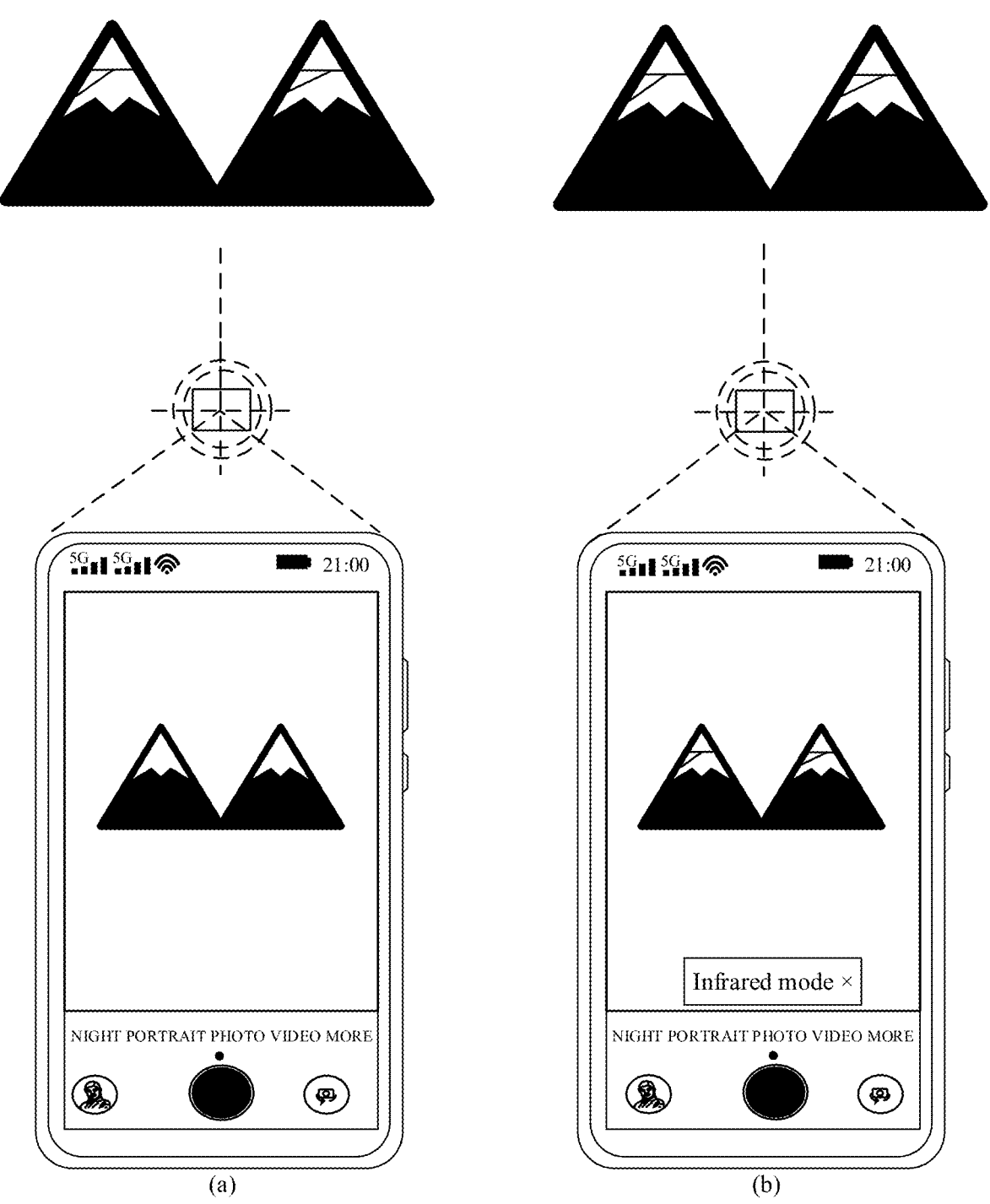
FIG. 13 is a schematic flowchart of effects of an image processing method according to an embodiment of this application.

FIG. 13 is a schematic flowchart of effects of an image processing method according to an embodiment of this application.

As shown in FIG. 13, (a) of FIG. 13 is an output image obtained by an existing main-camera module; and (b) of FIG. 13 is an output image obtained by performing the image processing method provided in the embodiments of this application. The image shown in (a) of FIG. 13 shows that detail information of mountains is seriously distorted. As compared to the output image shown in (a) of FIG. 13, detail information of the output image shown in (b) of FIG. 13 is richer, with the detail information of the mountains clearly displayed. The image processing method provided by the embodiments of this application can implement image enhancement on the image obtained by the main-camera module, so as to improve the detail information of the image.

In an example, in a dark light scene, a user may turn on an infrared flash in an electronic device, captures images by using a main-camera module and a near-infrared camera module, and processes the captured images by using the image processing method provided in the embodiments of this application to output processed images or videos.

FIG. 14 shows a graphics user interface (graphical user interface, GUI) of an electronic device.

A GUI shown in (a) of FIG. 14 is a desktop 910 of the electronic device. After the electronic device detects a tap operation by a user on an icon 920 of a camera application (application, APP) on the desktop 910, the camera application can be started, and another GUI shown in (b) of FIG. 14 is displayed. The GUI shown in (b) of FIG. 14 may be a display screen of the camera APP in photographing mode and the GUI may include a shooting screen 930. The shooting screen 930 may include a viewfinder frame 931 and a control. For example, the shooting screen 930 may include a control 932 for indicating to take a photo and a control 933 for turning on an infrared flash. In a preview state, the viewfinder frame 931 may display a preview image in real time. The preview state may be after the user turns on the camera but before the user presses a photo/record button. In this case, the viewfinder frame may display a preview image in real time.

After the electronic device detects an operation of tapping by the user on the control 933 for indicating to turn on the infrared flash, a shooting screen shown in (c) of FIG. 14 is displayed. When the infrared flash is turned on, images may be captured by a main-camera module and a near-infrared camera module, and fusion processing is performed on the captured images by using the image processing method provided in the embodiments of this application, so as to output a processed fused image.

Figure 15:
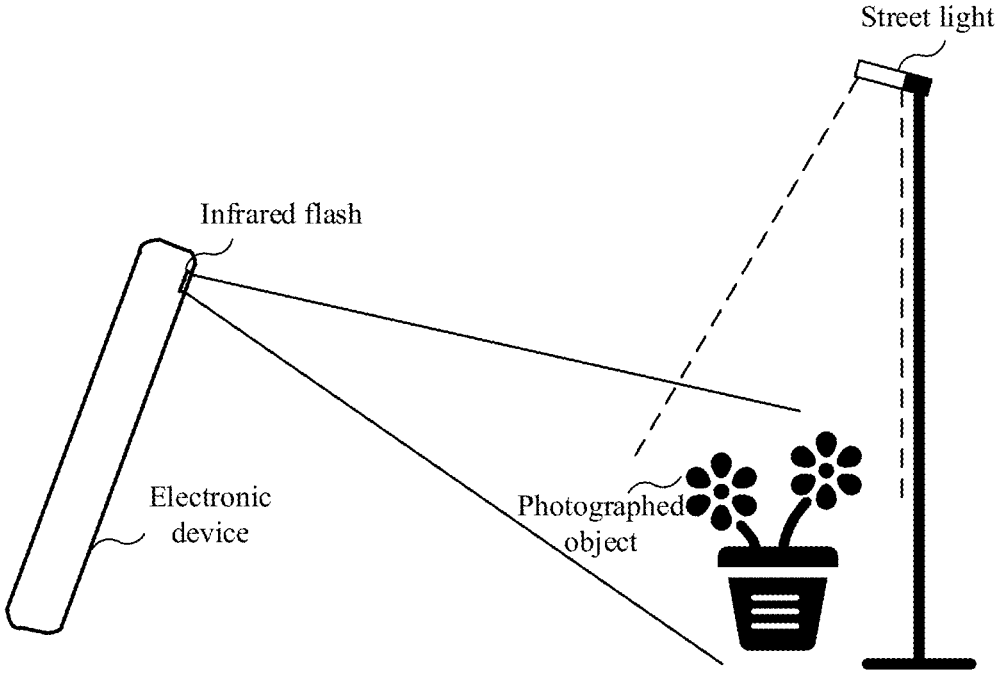
FIG. 15 is a schematic diagram of a light path in a shooting scene to which an embodiment of this application is applicable.

FIG. 15 is a schematic diagram of a light path in a shooting scene to which an embodiment of this application is applicable.

As shown in FIG. 15, an electronic device further includes an infrared flash. In a dark light scene, the electronic device may turn on the infrared flash; and when the infrared flash is turned on, light in a shooting environment may include street lights and infrared flash. The light in the shooting environment may be reflected by a photographed object, so that the electronic device obtains an image of the photographed object.

In this embodiment of this application, when the infrared flash is turned on, the reflected light of the photographed object increases, so that a near-infrared camera module in the electronic device has more light intake and detail information of an image captured by the near-infrared camera module is increased. The image processing method in the embodiments of this application is used to perform fusion processing on images captured by a main-camera module and the near-infrared camera module, so as to implement image enhancement on the image obtained by the main-camera module and improve detail information of the image. In addition, the infrared flash is invisible to the user, and the detail information of the images can be improved without user's perception.

It should be noted that the foregoing example is intended to help a person skilled in the art understand the embodiments of this application, but not to limit the embodiments of this application to specific values or a specific scenarios in the examples. A person skilled in the art may apparently perform various equivalent modifications or variations based on descriptions of the foregoing example, and such modifications or variations shall also fall within the scope of the embodiments of this application.

Figure 16:
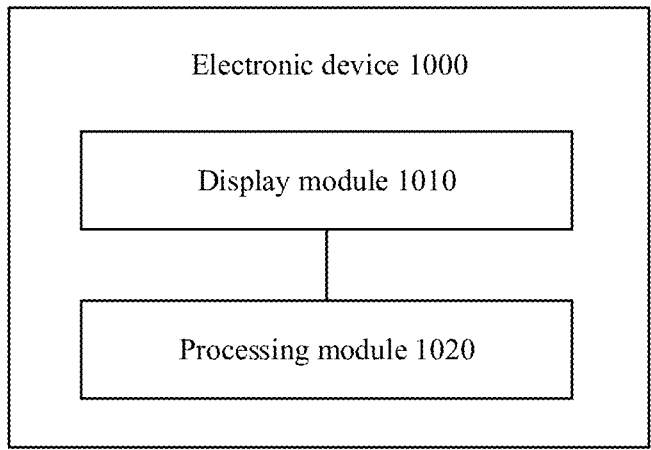
FIG. 16 is a schematic structural diagram of an electronic device according to an embodiment of this application.
Figure 17:
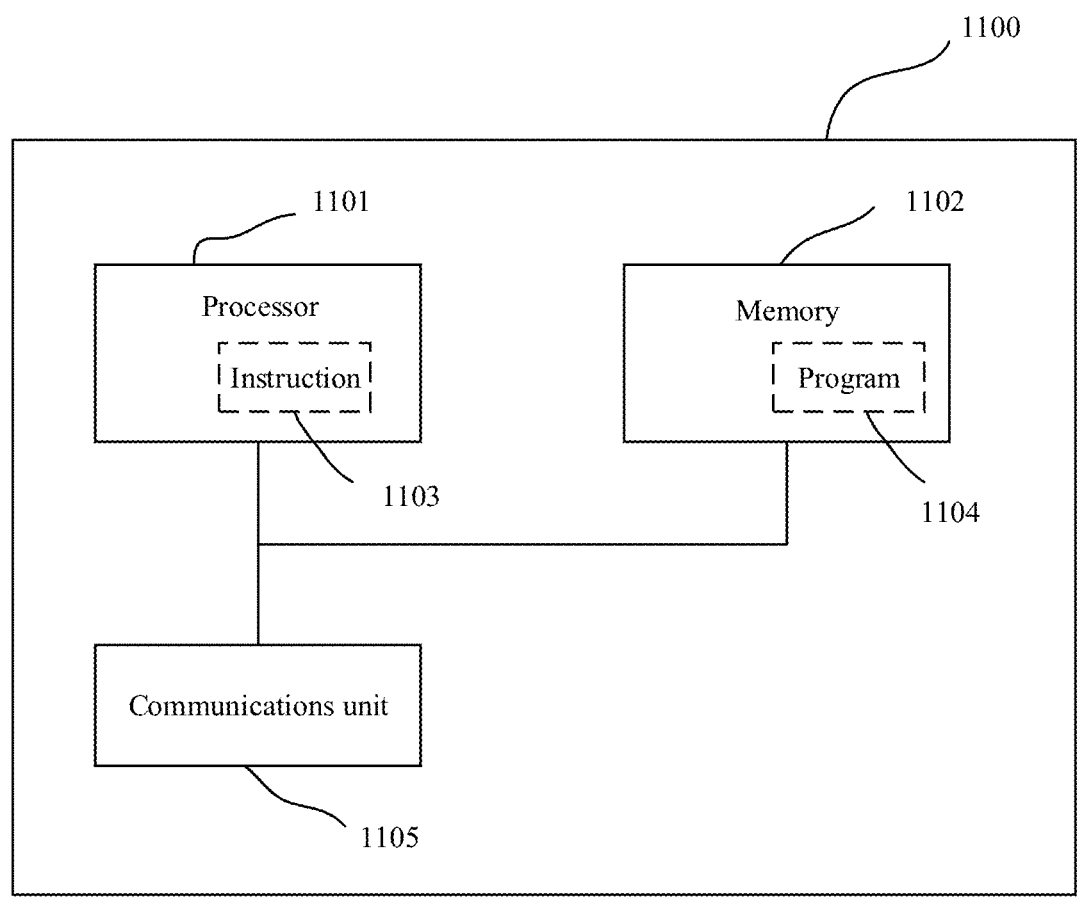
FIG. 17 is a schematic structural diagram of an electronic device according to an embodiment of this application.

The foregoing has described in detail the image processing method provided in the embodiments of this application with reference to FIG. 1 to FIG. 15, and the following describes in detail the apparatus embodiments of this application with reference to FIG. 16 and FIG. 17. It should be understood that the apparatus in the embodiments of this application can perform the methods in the foregoing embodiments of this application. For specific working processes of the products, refer to corresponding processes in the foregoing method embodiments.

FIG. 16 is a schematic structural diagram of an electronic device according to an embodiment of this application. The electronic device 1000 includes a display module 1010 and a processing module 1020. The electronic device includes a first camera module and a second camera module, and the first camera module is a near-infrared camera module or an infrared camera module.

The display module 1010 is configured to display a first screen, where the first screen includes a first control. The processing module 1020 is configured to detect a first operation on the first control; obtain a first image and a second image in response to the first operation, where the first image is an image captured by the first camera module, the second image is an image captured by the second camera module, and the first image and the second image are images in a first color space; perform first image processing on the first image to obtain a third image, where the third image is an image in a second color space; perform second image processing on the second image to obtain a fourth image that is in the second color space; and perform fusion processing on the third image and the fourth image based on at least two masks to obtain a fused image, where the at least two masks include at least two of a first mask, a second mask, or a third mask, the first mask is used to mark an image region with a better definition than that of the fourth image in the third image, the second mask is used to mark a ghosting region in the third image, the third mask is used to mark an image region in which a photographed object of a target type is located in the third image, and detail information of the fused image is better than detail information of the second image.

Optionally, in an embodiment, the processing module 1020 is specifically configured to:

obtain a target mask based on an intersection of the at least two masks; and perform fusion processing on the third image and the fourth image based on the target mask to obtain the fused image.

Optionally, in an embodiment, the processing module 1020 is specifically configured to:

convert the first image to the second color space to obtain a fifth image;

perform global registration processing on the fifth image by using the fourth image as a benchmark to obtain a sixth image; and perform local registration processing on the sixth image by using the fourth image as a benchmark to obtain the third image.

Optionally, in an embodiment, the processing module 1020 is specifically configured to:

perform depth estimation on the fourth image to obtain depth information, where the depth information is used to represent information of a distance between a photographed object in the fourth image and the electronic device;

select, based on the depth information, target feature points in the fourth image that meet a preset condition; and perform global registration processing on the fifth image by using the target feature points as a benchmark to obtain the sixth image.

Optionally, in an embodiment, the preset condition is that the distance between the photographed object and the electronic device is greater than a first preset threshold.

Optionally, in an embodiment, the processing module 1020 is specifically configured to:

perform local registration processing on the sixth image by using a lightness channel image corresponding to the fourth image as a benchmark to obtain the third image.

Optionally, in an embodiment, the processing module 1020 is specifically configured to:

obtain a seventh image based on a union of high-frequency information of the fourth image and high-frequency information of the sixth image;

determine a first image region in the fourth image based on the seventh image;

determine a second image region in the sixth image based on the seventh image; and perform local registration processing on the second image region by using the first image region as a benchmark to obtain the third image.

Optionally, in an embodiment, the at least two masks are the first mask and the third mask.

Optionally, in an embodiment, the at least two masks are the first mask, the second mask, and the third mask.

Optionally, in an embodiment, the electronic device further includes an infrared flash, and the processing module 1020 is specifically configured to:

turn on the infrared flash in a dark scene, where the dark scene means that an ambient brightness of a shooting environment in which the electronic device is located is less than a second preset threshold; and obtain the first image and the second image in a case that the infrared flash is turned on.

Optionally, in an embodiment, the first screen includes a second control; and the processing module 1020 is specifically configured to:

detect a second operation on the second control; and turn on the infrared flash in response to the second operation.

Optionally, in an embodiment, the first screen is a photographing screen, and the first control is a control for indicating to take a photograph.

Optionally, in an embodiment, the first screen is a video shooting screen, and the first control is a control for indicating to shoot a video.

Optionally, in an embodiment, the first screen is a video call screen, and the first control is a control for indicating to make a video call.

It should be noted that the electronic device 1000 is implemented in a form of a functional module. The term "module" herein may be implemented in the form of software and/or hardware, which is not specifically limited.

For example, a "module" may be a software program, a hardware circuit, or a combination of the two that implements the functions described above. The hardware circuit may include an application-specific integrated circuit (application specific integrated circuit, ASIC), an electronic circuit, a processor configured to execute one or more software or firmware programs (for example, a shared processor, a dedicated processor, or a group processor) and a memory, or a merged logic circuit and/or another appropriate component supporting the described functions.

Therefore, the units in the example described in the embodiments of this application can be implemented by electronic hardware, or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

FIG. 17 is a schematic structural diagram of an electronic device according to this application. A dotted line in FIG. 17 indicates that a unit or module is optional. The electronic device 1100 may be used to implement the method described in the foregoing method embodiment.

The electronic device 1100 includes one or more processors 1101, and the one or more processors 1101 can support the electronic device 1100 to implement the image processing methods in the method embodiments. The processor 1101 may be a general purpose processor or a special purpose processor. For example, the processor 1101 may be a central processing unit (central processing unit, CPU), a digital signal processor (digital signal processor, DSP), an application specific integrated circuit (application specific integrated circuit, ASIC), a field programmable gate array (field programmable gate array, FPGA), or other programmable logic devices such as discrete gates, transistor logic devices, or discrete hardware components.

The processor 1101 may be configured to control the electronic device 1100, execute a software program, and process data of the software program. The electronic device 1100 may further include a communications unit 1105, to implement signal input (reception) and output (transmission).

For example, the electronic device 1100 may be a chip; the communications unit 1105 may be an input and/or output circuit of the chip, or the communications unit 1105 may be a communication interface of the chip; and the chip may be a component of a terminal device or other electronic devices.

For another example, the electronic device 1100 may be a terminal device, and the communications unit 1105 may be a transceiver of the terminal device, or the communications unit 1105 may be a transceiver circuit of the terminal device.

The electronic device 1100 may include one or more memories 1102 on which a program 1104 is stored. The program 1104 may be executed by the processor 1101 to generate an instruction 1103, so that the processor 1101 executes, according to the instruction 1103, the image processing method described in the foregoing method embodiments.

Optionally, data may be also stored in the memory 11002.

Optionally, the processor 1101 may also read data stored in the memory 1102, the data may be stored in a same storage address as the program 1104, or the data may be stored at a different storage address from the program 1104.

The processor 1101 and the memory 1102 may be disposed separately or integrated together, for example, being integrated on a system on chip (system on chip, SOC) of a terminal device.

For example, the memory 1102 may be configured to store the related program 1104 of the image processing method provided in the embodiments of this application, and the processor 1101 may be configured to: during execution of image processing, call the related program 1104 of the image processing method stored in the memory 1102 to execute the image processing method in the embodiments of this application, for example, displaying a first screen, where the first screen includes a first control; detecting a first operation on the first control; obtaining a first image and a second image in response to the first operation, where the first image is an image captured by the first camera module, the second image is an image captured by the second camera module, and the first image and the second image are images in a first color space; performing first image processing on the first image to obtain a third image, where the third image is an image in a second color space; performing second image processing on the second image to obtain a fourth image that is in the second color space; and performing fusion processing on the third image and the fourth image based on at least two masks to obtain a fused image, where the at least two masks include at least two of a first mask, a second mask, or a third mask, the first mask is used to mark an image region with a better definition than that of the fourth image in the third image, the second mask is used to mark a ghosting region in the third image, the third mask is used to mark an image region in which a photographed object of a target type is located in the third image, and detail information of the fused image is better than detail information of the second image.

This application further provides a computer program product. When the computer program product is executed by the processor 1101, the image processing method according to any one of the foregoing method embodiments is implemented.

The computer program product may be stored in the memory 1102, and for example, is the program 1104. Through processing procedures such as preprocessing, compilation, assembly, and linking, the program 1104 is finally converted into an executable object file that can be executed by the processor 1101.

This application further provides a computer-readable medium, where a computer program is stored in the computer-readable medium. When the computer program is executed by a computer, the image processing method according to any one of the method embodiments in this application is implemented. The computer program may be a high-level language program or an executable object program.

The computer-readable storage medium is, for example, a memory 1102. The memory 1102 may be a volatile memory or a non-volatile memory, or the memory 1102 may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. As illustrative rather than restrictive description, many forms of RAM can be used, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct Rambus random access memory (direct Rambus RAM, DR RAM).

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, reference may be made to a corresponding process in the foregoing method embodiments, and details are not described again herein.

In the several embodiments provided in this application, it should be understood that the disclosed system, apparatus, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the term "and/or" in this specification is only an associative relationship for describing associated objects, indicating that three relationships may be present. For example, A and/or B may indicate three cases: presence of only A; presence of both A and B; and presence of only B. In addition, the character "/" in this specification generally indicates an "or" relationship between contextually associated objects.

When the functions are implemented in a form of a software functional unit and sold or used as an independent product, the functions may be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The above is only the specific implementation mode of the application and not intended to limit the scope of protection of the application. Any variations or replacements apparent to those skilled in the art within the technical scope disclosed by the application shall fall within the scope of protection of the application. Therefore, the protection scope of this application shall be subject to the protection scope of the claims. In summary, what is described above is merely exemplary embodiments of the technical solutions of this application, but is not intended to limit the protection scope of this application. Any modifications, equivalent replacements, or improvements made without departing from the spirit and principle of this application shall fall within the protection scope of this application.

What is claimed is:

1. An image processing method, applied to an electronic device, wherein the electronic device comprises a first camera module and a second camera module, the first camera module is a near-infrared camera module or an infrared camera module, and the second camera module is a visible light camera module different from the first camera module, and the image processing method comprises:

displaying a first screen, wherein the first screen comprises a first control;

detecting a first operation on the first control;

obtaining a first image and a second image in response to the first operation, wherein the first image is an image captured by the first camera module, the second image is an image captured by the second camera module, and the first image and the second image are images in a first color space;

performing first image processing on the first image to obtain a third image, wherein the third image is an image in a second color space, the first color space is a near-infrared raw color space, and the second color space is a YUV color space;

performing second image processing on the second image to obtain a fourth image that is in the second color space; and performing fusion processing on the third image and the fourth image based on at least two masks to obtain a fused image, wherein the at least two masks comprise at least two of a first mask, a second mask, or a third mask, the first mask is used to mark an image region with a better definition than the image region of the fourth image in the third image, the second mask is used to mark a ghosting region in the third image, the third mask is used to mark a target image region in which a photographed object of a target type is located in the third image, and detail information of the fused image is better than detail information of the second image, the detail information including edge information and texture information of the photographed object.

2. The image processing method according to claim 1, wherein the performing fusion processing on the third image and the fourth image based on at least two masks to obtain a fused image comprises:

obtaining a target mask based on an intersection of the at least two masks; and performing fusion processing on the third image and the fourth image based on the target mask to obtain the fused image.

3. The image processing method according to claim 1, wherein the performing first image processing on the first image to obtain a third image comprises:

converting the first image to the second color space to obtain a fifth image;

performing global registration processing on the fifth image by using the fourth image as a benchmark to obtain a sixth image; and performing local registration processing on the sixth image by using the fourth image as a benchmark to obtain the third image.

4. The image processing method according to claim 3, wherein the performing global registration processing on the fifth image by using the fourth image as a benchmark to obtain a sixth image comprises:

performing depth estimation on the fourth image to obtain depth information, wherein the depth information is used to represent a distance between a photographed object in the fourth image and the electronic device;

selecting, based on the depth information, target feature points in the fourth image that meet a preset condition; and performing global registration processing on the fifth image by using the target feature points as a benchmark to obtain the sixth image.

5. The image processing method according to claim 4, wherein the preset condition is that the distance between the photographed object and the electronic device is greater than a first preset threshold.

6. The image processing method according to claim 3, wherein the performing local registration processing on the sixth image by using the fourth image as a benchmark to obtain the third image comprises:

performing local registration processing on the sixth image by using a lightness channel image corresponding to the fourth image as a benchmark to obtain the third image.

7. The image processing method according to claim 3, wherein the performing local registration processing on the sixth image by using the fourth image as a benchmark to obtain the third image comprises:

obtaining a seventh image based on a union of high-frequency information of the fourth image and high-frequency information of the sixth image;

determining a first image region in the fourth image based on the seventh image;

determining a second image region in the sixth image based on the seventh image; and performing local registration processing on the second image region by using the first image region as a benchmark to obtain the third image.

8. The image processing method according to claim 1, wherein the at least two masks are the first mask and the third mask.

9. The image processing method according to claim 1, wherein the electronic device further comprises an infrared flash, and the image processing method further comprises:

turning on the infrared flash in a dark scene, wherein the dark scene means that an ambient brightness of a shooting environment in which the electronic device is located is less than a second preset threshold; and

the obtaining a first image and a second image in response to the first operation comprises:

obtaining the first image and the second image in a case that the infrared flash is turned on.

10. An electronic device, comprising:

one or more processors and a memory;

a first camera module and a second camera module, the first camera module is a near-infrared camera module or an infrared camera module, and the second camera module is a visible light camera module different from the first camera module; and the memory is coupled to the one or more processors, the memory is configured to store computer program code; the computer program code comprises computer instructions; and the one or more processors invoke the computer instructions to cause the electronic device to execute:

displaying a first screen, wherein the first screen comprises a first control;

detecting a first operation on the first control;

obtaining a first image and a second image in response to the first operation, wherein the first image is an image captured by the first camera module, the second image is an image captured by the second camera module, and the first image and the second image are images in a first color space;

performing first image processing on the first image to obtain a third image, wherein the third image is an image in a second color space, the first color space is a near-infrared raw color space, and the second color space is a YUV color space;

performing second image processing on the second image to obtain a fourth image that is in the second color space; and performing fusion processing on the third image and the fourth image based on at least two masks to obtain a fused image, wherein the at least two masks comprise at least two of a first mask, a second mask, or a third mask, the first mask is used to mark an image region with a better definition than the image region of the fourth image in the third image, the second mask is used to mark a ghosting region in the third image, the third mask is used to mark a target image region in which a photographed object of a target type is located in the third image, and detail information of the fused image is better than detail information of the second image, the detail information including edge information and texture information of the photographed object.

11. The electronic device according to claim 10, wherein the performing fusion processing on the third image and the fourth image based on at least two masks to obtain a fused image comprises:

obtaining a target mask based on an intersection of the at least two masks; and performing fusion processing on the third image and the fourth image based on the target mask to obtain the fused image.

12. The electronic device according to claim 10, wherein the performing first image processing on the first image to obtain a third image comprises:

converting the first image to the second color space to obtain a fifth image;

performing global registration processing on the fifth image by using the fourth image as a benchmark to obtain a sixth image; and

48 performing local registration processing on the sixth image by using the fourth image as a benchmark to obtain the third image.

13. The electronic device according to claim 12, wherein the performing global registration processing on the fifth image by using the fourth image as a benchmark to obtain a sixth image comprises:

performing depth estimation on the fourth image to obtain depth information, wherein the depth information is used to represent a distance between a photographed object in the fourth image and the electronic device;

selecting, based on the depth information, target feature points in the fourth image that meet a preset condition; and performing global registration processing on the fifth image by using the target feature points as a benchmark to obtain the sixth image.

14. The electronic device according to claim 13, wherein the preset condition is that the distance between the photographed object and the electronic device is greater than a first preset threshold.

15. The electronic device according to claim 12, wherein the performing local registration processing on the sixth image by using the fourth image as a benchmark to obtain the third image comprises:

performing local registration processing on the sixth image by using a lightness channel image corresponding to the fourth image as a benchmark to obtain the third image.

16. The electronic device according to claim 12, wherein the performing local registration processing on the sixth image by using the fourth image as a benchmark to obtain the third image comprises:

obtaining a seventh image based on a union of high-frequency information of the fourth image and high-frequency information of the sixth image;

determining a first image region in the fourth image based on the seventh image;

determining a second image region in the sixth image based on the seventh image; and performing local registration processing on the second image region by using the first image region as a benchmark to obtain the third image.

17. The electronic device according to claim 10, wherein the at least two masks are the first mask and the third mask.

18. The electronic device according to claim 10, wherein the electronic device further comprises an infrared flash, and the computer instructions further to cause the electronic device to execute:

turning on the infrared flash in a dark scene, wherein the dark scene means that an ambient brightness of a shooting environment in which the electronic device is located is less than a second preset threshold; and the obtaining a first image and a second image in response to the first operation comprises:

obtaining the first image and the second image in a case that the infrared flash is turned on.

19. The electronic device according to claim 10, wherein the first screen is a video shooting screen, and the first control is a control for indicating to shoot a video; or the first screen is a video call screen, and the first control is a control for indicating to make a video call; or the first screen is a photographing screen, and the first control is a control for indicating to take a photograph.

20. A computer-readable storage medium, wherein the computer-readable storage medium stores a computer program, and when the computer program is executed by a processor, an electronic device is caused to execute:

displaying a first screen, wherein the first screen comprises a first control;

detecting a first operation on the first control;

obtaining a first image and a second image in response to the first operation, wherein the first image is an image captured by a first camera module, the second image is an image captured by a second camera module, the first camera module is a near-infrared camera module or an infrared camera module, and the second camera module is a visible light camera module different from the first camera module, and the first image and the second image are images in a first color space;

performing first image processing on the first image to obtain a third image, wherein the third image is an image in a second color space, the first color space is a near-infrared raw color space, and the second color space is a YUV color space;

performing second image processing on the second image to obtain a fourth image that is in the second color space; and performing fusion processing on the third image and the fourth image based on at least two masks to obtain a fused image, wherein the at least two masks comprise at least two of a first mask, a second mask, or a third mask, the first mask is used to mark an image region with a better definition than the image region of the fourth image in the third image, the second mask is used to mark a ghosting region in the third image, the third mask is used to mark a target image region in which a photographed object of a target type is located in the third image, and detail information of the fused image is better than detail information of the second image, the detail information including edge information and texture information of the photographed object.

\* \* \* \* \*